(12) United States Patent
Narimatsu et al.

(10) Patent No.: US 10,460,424 B2
(45) Date of Patent: Oct. 29, 2019

(54) PROJECTOR AND METHOD FOR CONTROLLING PROJECTOR PROVIDING SUPPRESSION REGION

(71) Applicant: SEIKO EPSON CORPORATION, Tokyo (JP)

(72) Inventors: Shuji Narimatsu, Suwa (JP); Takateru Mori, Minowa-Machi (JP); Akira Nemura, Azumino (JP); Hiroyuki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 27 days.

(21) Appl. No.: 15/663,215

(22) Filed: Jul. 28, 2017

(65) Prior Publication Data
US 2018/0033123 A1 Feb. 1, 2018

(30) Foreign Application Priority Data
Aug. 1, 2016 (JP) ................................ 2016-151019

(51) Int. Cl.
| | |
|---|---|
| *G09G 5/02* | (2006.01) |
| *G06T 5/00* | (2006.01) |
| *G03B 21/14* | (2006.01) |
| *G06T 11/40* | (2006.01) |
| *G09G 3/00* | (2006.01) |
| *G09G 5/00* | (2006.01) |
| *G03B 21/26* | (2006.01) |
| *H04N 9/31* | (2006.01) |

(Continued)

(52) U.S. Cl.
CPC ............ *G06T 5/006* (2013.01); *G03B 21/142* (2013.01); *G03B 21/26* (2013.01); *G06T 11/40* (2013.01); *G09G 3/001* (2013.01); *G09G 5/003* (2013.01); *H04N 9/3185* (2013.01); *H04N 9/3194* (2013.01); *G03B 21/28* (2013.01); *G03B 21/54* (2013.01); *G09G 2320/0666* (2013.01)

(58) Field of Classification Search
CPC ...... G03B 21/142; G03B 21/00; G03B 21/10; H04N 5/74; G06T 11/40
See application file for complete search history.

(56) References Cited

U.S. PATENT DOCUMENTS

| | | | |
|---|---|---|---|
| 6,896,375 B2 | 5/2005 | Peterson et al. | |
| 7,009,765 B2 | 3/2006 | Gohman | |

(Continued)

FOREIGN PATENT DOCUMENTS

| | | |
|---|---|---|
| JP | 2001-205610 A | 7/2001 |
| JP | 2007-525700 A | 9/2007 |
| JP | 2012-194529 A | 10/2012 |

*Primary Examiner* — Weiming He
(74) *Attorney, Agent, or Firm* — Oliff PLC

(57) ABSTRACT

A projector includes a light source, a light modulator that has an image drawing region where an image is drawable and modulates light emitted from the light source by using an image drawn in the image drawing region, and a projection system that includes a projection lens and projects image light modulated by the light modulator. The projector further includes a lens shift mechanism that moves the projection lens and a control section that controls the image drawing performed by the light modulator, and the control section provides, based on the position of the projection lens, the image drawing region of the light modulator with a suppression region where the amount of the image light is suppressed.

9 Claims, 11 Drawing Sheets

(51) Int. Cl.
    *G03B 21/28*       (2006.01)
    *G03B 21/54*       (2006.01)

(56) References Cited

U.S. PATENT DOCUMENTS

| | | |
|---|---|---|
| 7,090,354 B2 | 8/2006 | Engle et al. |
| 7,150,537 B2 | 12/2006 | Peterson et al. |
| 7,175,287 B2 | 2/2007 | Gohman |
| 7,413,312 B2 | 8/2008 | Engle et al. |
| 8,905,557 B2 | 12/2014 | Kano |
| 9,128,360 B2 | 9/2015 | Kano |
| 9,217,912 B2 | 12/2015 | Peterson et al. |
| 9,429,826 B2 | 8/2016 | Peterson et al. |
| 2004/0032570 A1 | 2/2004 | Peterson et al. |
| 2004/0032653 A1 | 2/2004 | Gohman |
| 2004/0223123 A1 | 11/2004 | Engle et al. |
| 2004/0233394 A1 | 11/2004 | Gohman |
| 2004/0257539 A1 | 12/2004 | Peterson et al. |
| 2006/0290897 A1 | 12/2006 | Engle et al. |
| 2007/0146652 A1 | 6/2007 | Peterson et al. |
| 2008/0304018 A1* | 12/2008 | Tanis-Likkel ............ G03B 21/26 353/30 |
| 2009/0244493 A1* | 10/2009 | Aragaki ................ H04N 9/3182 353/69 |
| 2010/0195063 A1* | 8/2010 | Fujimaki ............... G03B 21/142 353/101 |
| 2012/0218528 A1 | 8/2012 | Kano |
| 2015/0042965 A1 | 2/2015 | Peterson et al. |
| 2015/0070664 A1 | 3/2015 | Kano |
| 2016/0070158 A1 | 3/2016 | Peterson et al. |
| 2016/0341943 A1 | 11/2016 | Peterson et al. |
| 2016/0342075 A1 | 11/2016 | Peterson et al. |
| 2016/0381334 A1* | 12/2016 | Poisner ................. H04N 9/3194 348/745 |

* cited by examiner

PROJECTOR AND METHOD FOR CONTROLLING PROJECTOR PROVIDING SUPPRESSION REGION

BACKGROUND

1. Technical Field

The present invention relates to a projector and a method for controlling the projector.

2. Related Art

There is a known projector of related art that moves a projection lens to move the position of a projection image on a projection screen (see JP-A-2001-215610, for example). In the case of a projector of this type, if the amount of movement of the lens is too large, part of the projection screen is likely to become a blank portion. To avoid the situation described above, the projector described in JP-A-2001-215610 stops movement of the projection lens when the position of the projection lens does not allow the entire display region of a liquid crystal panel to fall within the projection lens.

When the projection lens is moved as described above, part of the projection image is lost in some cases due to the positional relationship of the structure of the main body of the projector and the optical design thereof with the optical axis of the projection lens. For example, part of projection light having exited out of the projection lens is blocked by the main body of the projector or an accessary associated therewith and does not reach the screen in some cases, and part of the projection image is therefore lost. The phenomenon is known as vignetting. Further, for example, part of the image light does not fall within the image circle or the projectable range of the projection lens. In this case, vignetting or a situation in which part of the projection image is lost by the projection lens occurs. When the vignetting described above occurs, in addition to loss of part of the image, heat generation and other undesirable phenomena resulting from the blocked light are likely to cause unintended effects.

To avoid problems of the type described above, the apparatus described in JP-A-2001-215610, for example, has the function of stopping the movement of the projection lens. Restricting the movement of the projection lens is, however, likely to restrict the usage of the projector, resulting in a decrease in convenience. For example, even when part of a projection image is lost, the range where no loss occurs can be used to project an image, but such a usage cannot be employed when the movement of the projection lens is restricted.

SUMMARY

An advantage of some aspects of the invention is to avoid or suppress effects and problems due to loss of part of a projection image not to compromise the convenience of a projector.

An aspect of the invention is directed to a projector including a light source, a light modulator that has an image drawing region where an image is drawable and modulates light emitted from the light source by using an image drawn in the image drawing region, a projection system that includes a projection lens and projects image light modulated by the light modulator, a lens shift mechanism that moves the projection lens in a direction perpendicular to an optical axis of the projection lens, and a control section that controls the image drawing performed by the light modulator, and the control section provides, based on a position of the projection lens, the image drawing region of the light modulator with a suppression region where an amount of the image light is suppressed.

According to the aspect of the invention, even if part of a projection image is lost due to the positional relationship of the structure of the main body and the optical design of the projector with the optical axis of the projection lens, an image can be projected by using a range where no loss occurs. Further, since the light modulator suppresses the amount of light projected in an improper direction, adverse effects due to the improper light can be avoided or suppressed. Effects and problems due to loss of part of a projection image can therefore be avoided or suppressed in such a way that the convenience of the projector is not compromised.

In the aspect of the invention, the projector may further include an acquisition section that acquires image data, and the control section may draw an image based on the image data acquired by the acquisition section in the image drawing region and in a position where the image does not overlap with the suppression region.

According to the aspect of the invention with this configuration, a region where no loss of a projection image occurs can be used to project the image.

In the aspect of the invention, the control section may fill the suppression region with a predetermined color other than colors in the image based on the image data.

According to the aspect of the invention with this configuration, filling the suppression region of the light modulator with a predetermined color allows suppression of the amount of light projected in an improper direction.

In the aspect of the invention, the control section may draw the entire image based on the image data in the image drawing region but in a region excluding the suppression region.

According to the aspect of the invention with this configuration, a region where no loss of a projection image occurs can be used to project the entirety of an image based on the image data.

In the aspect of the invention, the projector may further include a lens attachment section to which the projection lens is detachably fixed and an identification section that identifies a type of the projection lens fixed to the lens attachment section, and the control section may provide, based on the position of the projection lens and the type of the projection lens determined by the identification section, the image drawing region of the light modulator with the suppression region where the amount of the image light is suppressed.

According to the aspect of the invention with this configuration, providing the suppression region in correspondence with the type of the projection lens allows suppression of the amount of light projected in an improper direction. Therefore, for example, in the case of the projection lens is replaced, the projector can address the problem of loss of part of a projection image resulting from the positional relationship of the structure of the main body and the optical design of the projector with the optical axis of the projection lens.

In the aspect of the invention, the projection system may be so configured that a center of an image circle of the projection lens is shifted toward one side from a center of the image drawing region.

According to the aspect of the invention with this configuration, in the case of use of a projection lens so designed that the image light passes through a portion shifted toward one side with respect to the center of the image circle of the projection lens, the amount of light projected in an improper direction is suppressed. Therefore, in a configuration in which loss of part of an image tends to occur, as in the case of what is called a short-focal-length lens, suppressing the amount of light projected in an improper direction allows prevention or suppression of radiation of the light in an unintended direction.

In the aspect of the invention, the projection lens may include a non-circular lens or mirror having a roughly circular outer shape part of which is lost and form a lens unit that includes the projection lens and a lens barrel that accommodates the projection lens.

According to the aspect of the invention with this configuration, the light modulator can suppress light that deviates from the image circle of the lens, whereby effects of irradiation of the interior of the projector and the interior of the lens barrel with the light that deviates from the image circle can be suppressed. For example, increase in temperature and other adverse effects in the interior of the projector and the interior of the lens barrel can be avoided or suppressed.

In the aspect of the invention, the projector may further include a main body that accommodates at least the light source and the light modulator, the projection system may radiate the image light through one side of the main body toward another side thereof, the control section may provide the image drawing region of the light modulator with the suppression region in a position corresponding to the image light with which a surface of the main body is irradiated via the projection system, and the control section may draw the image in a position where the image does not overlap with the suppression region.

According to the aspect of the invention with this configuration, when part of the light having exited out of the projection system is blocked by the main body so that vignetting occurs, the amount of light blocked by the main body can be reduced, and an image can be projected within a range where the image light is not blocked by the main body. Effects of the light reflected off the main body can therefore be suppressed, whereby a necessary image can be projected with no portion thereof blocked by the main body.

Another aspect of the invention is directed to a method for controlling a projector including a light source, a light modulator that has an image drawing region where an image is drawable and modulates light emitted from the light source by using an image drawn in the image drawing region, a projection system that includes a projection lens and projects image light modulated by the light modulator, and a lens shift mechanism that moves the projection lens, the method including controlling the projector to provide, based on a position of the projection lens, the image drawing region of the light modulator with a suppression region where an amount of the image light is suppressed.

According to the aspect of the invention, even if part of a projection image is lost due to the positional relationship of the structure of the main body and the optical design of the projector with the optical axis of the projection lens, an image can be projected by using a range where no loss occurs. Further, since the light modulator suppresses the amount of light projected in an improper direction, adverse effects due to the improper light can be avoided or suppressed. Effects and problems due to loss of part of a projection image can therefore be avoided or suppressed in such a way that the convenience of the projector is not compromised.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings.

First Embodiment

Figure 1:
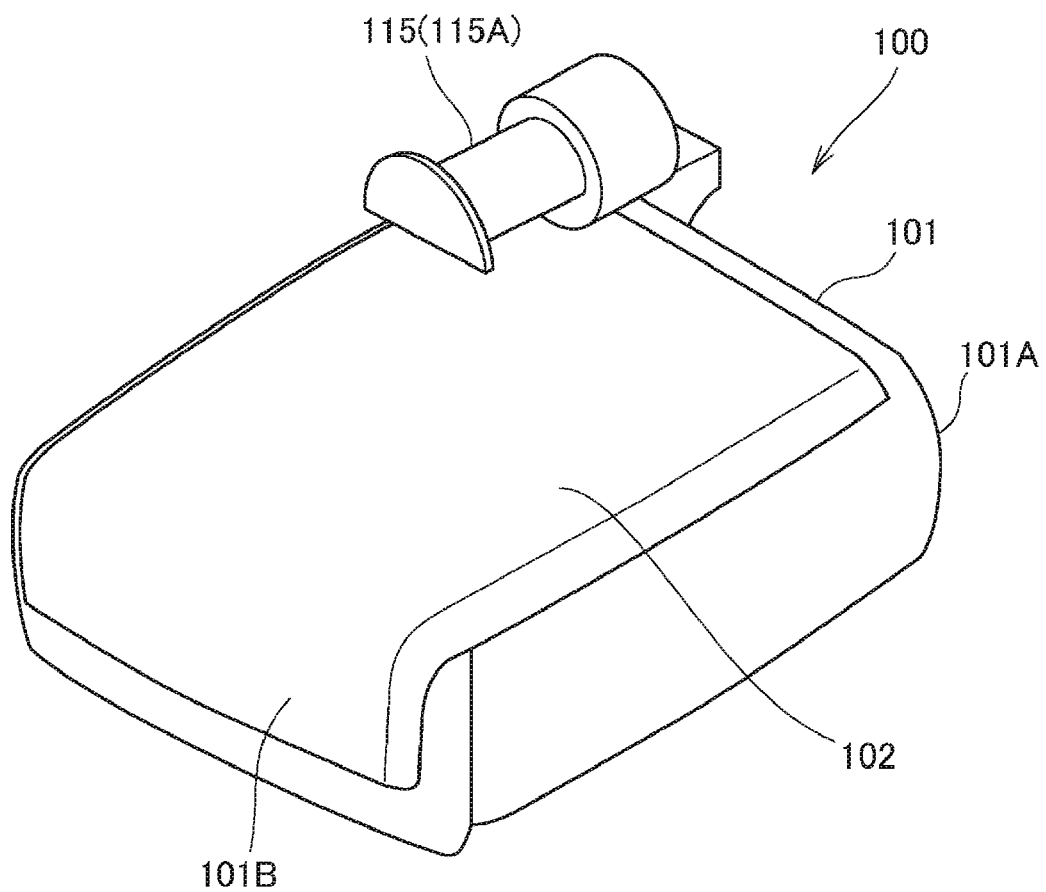
FIG. 1 is an exterior appearance view of a projector according to a first embodiment.

FIG. 1 is an exterior appearance view of a projector 100 according to a first embodiment to which the invention is applied. The projector 100 includes a main body 101 and a lens unit 115, which can be attached to and detached from the main body 101. FIG. 1 shows a configuration example in which a short-focal-length lens unit 115A is attached as the lens unit 115 to the main body 101.

The main body 101 has a roughly box-like shape, and a projection section 110 (FIG. 2), which will be described later, and other portions are accommodated in the main body 101. It is assumed that an end portion of the main body 101 on one side in the longitudinal direction thereof is called an end portion 101A and an end portion on the other side is called an end portion 101B. An upper surface 102 of the main body 101 is configured to be a roughly flat surface.

A lens mount 117 (FIG. 2) is disposed at the end portion 101A of the main body 101. The lens mount 117 (lens attachment section) functions as an attachment section to which the lens unit 115 is attached. The lens unit 115A shown in FIG. 1 causes light having exited out of the main body 101 toward the end portion 101A to travel toward the end portion 101B.

Although will be described later in detail, the lens unit 115 is replaceable. The lens unit 115 attached to the lens mount 117 is detached, and another type of lens unit 115 can be attached.

Figure 2:
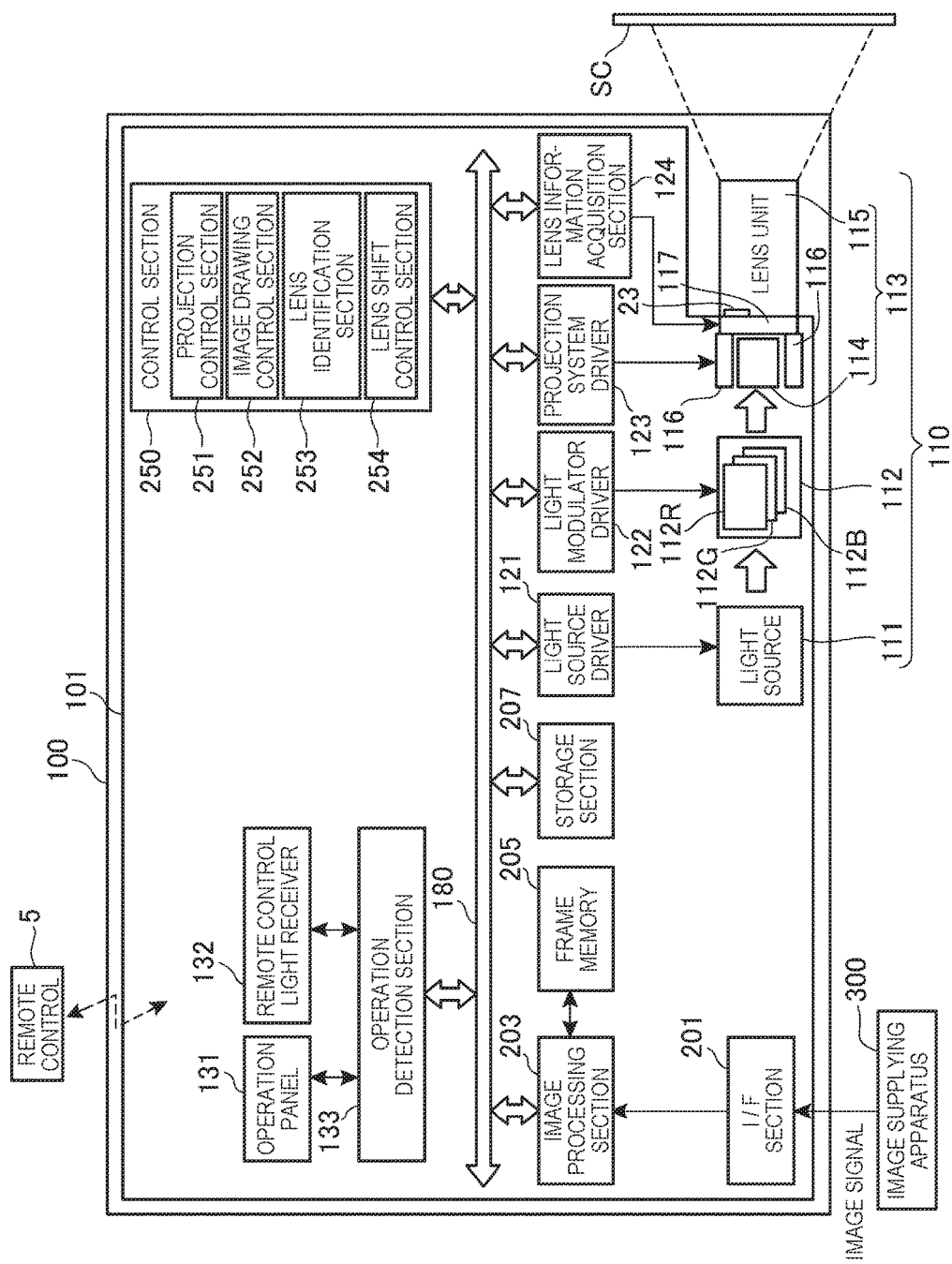
FIG. 2 is a functional block diagram of the projector.

FIG. 2 is a functional block diagram showing the configuration of the projector 100.

The projector 100 is connected to an external image supplying apparatus 300, such as a personal computer and a variety of video players, and projects an image based on an image signal supplied from the image supplying apparatus 300 on a projection target.

The image supplying apparatus 300 is, for example, a video reproducing apparatus, a DVD (digital versatile disk) reproducing apparatus, a television tuner, a CATV (cable television) set-top box, a video outputting apparatus, such as a video game console, and a personal computer.

In the present embodiment, a screen SC is the projection target. The screen SC is formed of a flat surface or a curtain and has an arbitrary specific shape. The projection target is not limited to the screen SC and may instead be a wall surface, a ceiling surface, a floor surface, or any other uniform flat surface. The projection target may still instead be an uneven surface, such as an outer wall of a building.

The usage of the projector 100 may be front projection in which image light is projected on the screen SC from a position in front thereof or a rear projection in which image light is projected on the rear surface of the screen SC.

The projector 100 includes an interface (I/F) section 201, which connects the projector 100 to the image supplying apparatus 300. The interface section 201 is a wired interface that is connected to the image supplying apparatus 300 via a cable and/or a wireless communication interface via which the projector 100 wirelessly transmits and receives data to and from the image supplying apparatus 300. For example, the interface section 201 may, for example, be an interface for data communication, such as an interface compliant with Ethernet (registered trademark), IEEE1394, USB, and RS-232C. The interface section 201 may instead be an interface for image data, such as an interface compliant with MHL (registered trademark), HDMI (registered trademark), and DisplayPort. In preparation for a case where an analog image signal is inputted from the image supplying apparatus 300, the interface section 201 may include an A/D conversion circuit that converts the analog image signal into digital data.

The interface section 201 (acquisition section) converts an image signal inputted from the image supplying apparatus 300 into image data and outputs the image data to an image processing section 203.

The projector 100 includes the projection section 110, which forms an optical image, and an image processing system that electrically processes the image displayed by the projection section 110.

The projection section 110 includes a light source 111, a light modulator 112, and a projection system 113.

The light source 111 includes a lamp, such as a xenon lamp and an ultrahigh-pressure mercury lamp, or solid-state light source, such as an LED (light emitting diode) and a laser light source. The light source 111 is connected to a light source driver 121. The light source driver 121 is connected to a bus 180 and controls electric power supplied to the light source 111 under the control of a control section 250, which is also connected to the bus 180, to turn on and off the light source 111.

Light emitted from the light source 111 is incident on the light modulator 112. The light source 111 may include a reflector that guides the light emitted from the light source to the light modulator 112.

The light modulator 112 includes modulation devices that modulate light emitted from the light source 111. In the present embodiment, the light modulator 112 includes three liquid crystal panels 112R, 112G, and 112B corresponding to color components R (red), G (green), and B (blue). In this configuration, the light emitted from the light source 111 is separated by a dichroic mirror (not shown) or any other optical system into R, G, and B color light fluxes, which are incident on the light modulator 112. The liquid crystal panels 112R, 112G, and 112B provided in the light modulator 112 modulate the R, G, and B color light fluxes, respectively. The light fluxes modulated by the light modulator 112 form image light, which exits toward the projection system 113.

The light modulator 112 is connected to a light modulator driver 122. The light modulator driver 122 is connected to the control section 250 via the bus 180 and draws images on the liquid crystal panels 112R, 112G, and 112B under the control of the control section 250.

The light modulator driver 122 receives, as inputs, image data corresponding to the R, G, and B primary colors from the image processing section 203. The light modulator driver 122 converts the inputted image data into data signals suitable for the action of the liquid crystal panels 112R, 112G, and 112B. The light modulator driver 122 applies voltage to each pixel in the liquid crystal panels 112R, 112G, and 112B on the basis of the converted data signals to draw images on the liquid crystal panels 112R, 112G, and 112B.

The projection system 113 includes an internal optical system 114, which is disposed in the main body 101, and the lens unit 115. The internal optical system 114 guides the image light modulated by the light modulator 112 to the lens unit 115 attached to the lens mount 117. The internal optical system 114 includes a prism, a mirror, a lens array, or another type of optical element.

The lens mount 117 is a jig that fixes the lens unit 115. In the state in which the lens unit 115 is attached to the lens mount 117, the lens unit 115 is supported by the lens mount 117.

A specific example of the configuration of the lens unit 115 and the lens mount 117 will be presented. For example, the lens unit 115 and the lens mount 117 can be provided with a ring and a barrel each of which is made of a metal. In this configuration, the metal ring is disposed around an end portion of the lens unit 115, and the ring has a protrusion formed thereon. The lens mount 117 is provided with the metal barrel that accommodates the ring disposed around the lens unit 115, and the barrel has a groove which is formed on the inner side thereof and into which the protrusion on the ring around the lens unit 115 fits. In this configuration, when the ring around the lens unit 115 is fit into the barrel on the lens mount 117, the lens unit 115 is held by the lens mount 117. Further, when the protrusion on the ring around the lens unit 115 fits into the groove in the barrel on the lens mount 117, the lens unit 115 is fixed to the lens mount 117. It is noted that the lens unit 115 may be detachably fixed to the lens mount 117 in an arbitrary structure, and a structure in which the lens unit 115 is fixed to the lens mount 117 with a magnet or a bolt may be employed. A structure using a part made of a resin can, of course, be employed.

The lens unit 115 includes a lens ID memory 23, which stores information representing information that identifies the type and individual identity of the lens unit 115. The lens ID memory 23 may be a storage device that stores information in a rewritable manner or a recording medium on which information is recorded in a non-rewritable manner.

The lens mount 117 is configured to be capable of reading information stored by the lens ID memory 23 or recorded on the lens ID memory 23. In detail, a lens information acquisition section 124 is connected to the lens mount 117 and carries out the process of reading the information from the lens ID memory 23.

The lens ID memory 23 may, for example, be a semiconductor memory device or a noncontact IC tag, such as an RFID (Radio Frequency IDentifier). In this case, the lens mount 117 may include a read terminal electrically continuous with a terminal of the lens ID memory 23 or may include an antenna and an interface circuit for reading data from the lens ID memory 23 in a noncontact manner. The read terminal or the interface circuit forms part of the lens information acquisition section 124.

The lens ID memory 23 may have a structure representing the type and ID of the lens unit 115 in the form of the shape or arrangement of the structure. For example, the lens ID memory 23 may be formed of a metal piece or a resin piece that reflects light. The lens ID memory 23 may instead, for example, be a metal piece or a resin piece having a hole representing the type and ID of the lens unit 115. In this case, the lens information acquisition section 124 may include a photosensor that is provided as part of the lens mount 117 and detects the number of metal pieces or resin pieces described above or the number and arrangement of holes.

The lens mount 117 is supported by the main body 101 via a lens shift mechanism 116. The lens shift mechanism 116 is a mechanism that shifts the lens mount 117. For example, the lens shift mechanism 116 includes a motor or an actuator, a gear that moves the lens mount 117 on the basis of the action of the motor or the actuator, and a rail that shiftably supports the lens mount 117.

A projection system driver 123 is connected to the lens shift mechanism 116. The projection system driver 123 is further connected to the control section 250 via the bus 180. The projection system driver 123 causes the motor or the actuator of the lens shift mechanism 116 to operate under the control of the control section 250. For example, the lens shift mechanism 116 may be configured to include a stepper motor. In this case, the projection system driver 123 may be configured to output drive electric power for driving the stepper motor of the lens shift mechanism 116 and drive pulses for specifying the amount of action of the stepper motor to the lens shift mechanism 116.

When the lens shift mechanism 116 operates, the lens mount 117 moves. The position of the lens unit 115 can therefore be shifted. The direction in which the lens unit 115 is shifted, that is, the direction in which the lens mount 117 is moved is, for example, the direction in which a projection image projected on the screen SC is moved in the rightward/leftward direction (X direction in FIG. 5) and the upward/downward direction (Y direction in FIG. 5).

The main body 101 includes an operation panel 131. The operation panel 131 is disposed on the surface of the main body 101 and in a position where a user can operate the operation panel 131. The operation panel 131 includes switches operated by the user. The operation panel 131 may further include indicators that display the action state of the projector 100 and the detail of switch operation.

The operation panel 131 is connected to an operation detection section 133. The operation detection section 133 detects operation performed on any of the switches on the operation panel 131 and outputs an operation signal corresponding to the operated switch to the control section 250. Further, the operation detection section 133 turns on an indicator lamp on the operation panel 131 and causes it to illuminate or blink in accordance with the action state and setting state of the projector 100 under the control of the control section 250.

The projector 100 includes a remote control 5 used by the user. The remote control 5 includes switches and buttons operated by the user and transmits an infrared signal in correspondence with operation performed on any of the switches and buttons.

The main body 101 includes a remote control light receiver 132, which receives the infrared signal issued by the remote control 5. The remote control light receiver 132 receives the infrared signal issued by the remote control 5, decodes the infrared signal to generate operation signal representing the content of the operation performed on the remote control 5, and outputs the operation signal to the control section 250.

The image processing system of the projector 100 is formed primarily of the control section 250, which controls the projector 100. The image processing system includes the control section 250, the image processing section 203, a frame memory 205, and a storage section 207. The control section 250, the image processing section 203, and the storage section 207 are connected to the bus 180.

The image processing section 203 determines the attributes of the image data inputted via the interface section 201 under the control of the control section 250. For example, the image processing section 203 evaluates the image data in terms of image size and resolution, determines whether the image data contains a 2D (planar) image or a 3D (stereoscopic) image, determines whether the image data contains still images or motion images, and evaluates the image data in terms of frame rate. The image processing section 203 writes the image data in the frame memory 205 on a frame basis and performs image processing on the written images.

The image processing performed by the image processing section 203 includes, for example, a resolution conversion (scaling) process, a frame rate conversion process, a shape correction process, a zoom process, a color tone correction process, a luminance correction process, and a gamma correction process. A plurality of the processes described above can, of course, be carried out in combination.

The resolution conversion process is the process in which the image processing section 203 converts the resolution of the image data in accordance with resolution specified by the control section 250, for example, the display resolution of the liquid crystal panels 112R, 112G, and 112B.

The frame rate conversion process is the process in which the image processing section 203 converts the frame rate associated with the image data into a frame rate specified by the control section 250.

The shape correction process is the process in which the image processing section 203 converts the image data in accordance with a correction parameter inputted from the control section 250 to correct the shape of an image to be projected on the screen SC.

The zoom process is the process in which the image processing section 203 enlarges or reduces an image when zoom instruction is issued by operation performed on the remote control 5 or the operation panel 131.

The color tone correction process is the process of converting the color tone of the image data. The image processing section 203 changes pixel data contained in the image data in accordance with a color tone specified by the control section 250. The projector 100 carries out the color tone correction process to achieve, for example, a color tone appropriate for movie viewing, a color tone appropriate for a case where the screen SC is installed in a bright environment, and a color tone appropriate for a case where projection is performed on a non-white screen SC, such as a blackboard. The image processing section 203 may perform contrast adjustment and other types of image processing in addition to the color tone correction process.

The luminance correction process is the process in which the image processing section 203 corrects the luminance of the image data. The luminance correction process corrects the luminance of the image data to luminance corresponding to the light emission state of the light source 111 and the brightness or any other factor in the environment in which the projector 100 is installed.

The content and parameter of each of the above-mentioned processes carried out by the image processing section 203 and the points of time when the process is initiated and terminated are controlled by the control section 250. When the image processing section 203 carries out any of the processes described above, the data on the pixels of an image drawn in the frame memory 205 are updated accordingly.

The image processing section 203 reads the image data formed of the pixel data in the frame memory 205, separates the image data into R, G, and B color image data sets, and outputs the separated image data sets to the light modulator driver 122. The light modulator driver 122 thus draws (forms) an image on the liquid crystal panel 112R on the basis of the R image data, draws an image on the liquid crystal panel 112G on the basis of the G image data, and draws an image on the liquid crystal panel 112B on the basis of the B image data.

The storage section 207 stores a variety of data and programs in a nonvolatile manner. The storage section 207 is formed of a flash ROM, an EEPROM (electrically erasable programmable read-only memory), or any other nonvolatile memory device. The storage section 207 stores data to be processed by the control section 250 and a control program executed by the control section 205.

Figure 3:
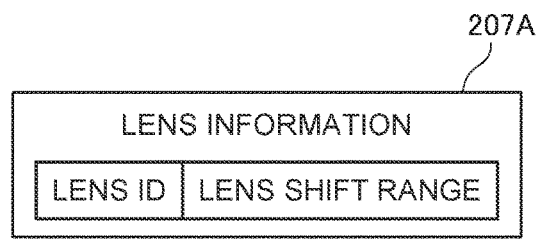
FIG. 3 is a diagrammatic view of lens information stored in a storage section.

The storage section 207 further stores lens information 207A (FIG. 3).

FIG. 3 is a diagrammatic view showing an example of the lens information 207A stored in the storage section 207.

The lens information 207A shown in FIG. 3 by way of example contains a lens ID and a lens shift range corresponding to the lens ID. The lens ID is information stored in the lens ID memory 23 and readable by the lens information acquisition section 124. The lens ID may, for example, be information representing the type of the lens unit 115 or an ID that identifies the individual identity of the lens unit 115. The lens shift range contained in the lens information 207A is a range set in advance as an appropriate range over which the lens mount 117 is moved. It can be said that the lens shift range is the range of the position of the lens mount 117. It can further be said that the lens shift range is the action range of the lens shift mechanism 116, which moves the lens mount 117.

Although will be described later in detail, within the range over which the lens shift mechanism 116 can move the lens mount 117, a problem occurs in some cases depending on the type of the lens unit 115. For example, in a case where the shape of one lens unit 115 differs from those of other lens units 115, moving the lens mount 117 causes interference between the lens unit 115 and the main body 101 in some cases. In a case where the shape and size of the lens unit 115 vary depending on the type thereof, the problem described above may occur. The lens information 207A contains the lens ID, which is the information that allows identification of the type of the lens unit 115, with the lens ID related at least to an appropriate position of the lens mount 117. The control section 250 can therefore evaluate whether or not the position of the lens mount 117 falls within an appropriate range in correspondence with the type of the lens unit 115, as described later.

The control section 250 includes a CPU (central processing unit), a ROM (read only memory), a RAM (random access memory), and other types of hardware (none of them is shown). The control section 250 causes the CPU to execute a predetermined control program to control the projector 100. The ROM is a nonvolatile storage device and stores the control program executed by the CPU and data processed in the control program. The RAM forms a work area used by the CPU. The CPU develops, in the RAM, the control programs read from the ROM and the storage section 207 and executes the developed control programs to control each portion of the projector 100.

The control section 250 further includes a projection control section 251, an image drawing control section 252, a lens identification section 253, and a lens shift control section 254 as functional blocks. The functional blocks are achieved when the CPU executes the control programs stored in the ROM and the storage section 207.

The projection control section 251 controls the image processing section 203 to cause it to draw an image in the frame memory 205 on the basis of the image data supplied from the image supplying apparatus 300 via the I/F section 201. The projection control section 251 further controls the light modulator driver 122 to cause it to draw the image drawn in the frame memory 205 on each of the liquid crystal panels 112R, 112G, and 112B.

The image drawing control section 252 controls the range over which the light modulator driver 122 draws images on the liquid crystal panels 112R, 112G, and 112B. The light modulator driver 122 determines the values of the pixels (pixel values) provided in each of the liquid crystal panels 112R, 112G, and 112B on the basis of the image data inputted from the image processing section 203 to perform the image drawing. The image drawing control section 252 notifies the light modulator driver 122 of the range over which the image drawing is performed on each of the liquid crystal panels 112R, 112G, and 112B. The light modulator driver 122 draws the images over the notified range on the liquid crystal panels 112R, 112G, and 112B. In this case, since no image drawing is performed on the pixels outside the notified range, the pixels values of the out-of-range pixels are not determined, and the light modulator driver 122 can set the pixel values of the pixels outside the notified range, for example, to be black (R, G, B=0, 0, 0, for example).

The lens identification section 253 (identification section) identifies and determines the type of the lens unit 115 attached to the lens mount 117 on the basis of the lens ID acquired by the lens information acquisition section 124 from the lens ID memory 23.

The lens shift control section 254 controls the projection system driver 123 to set the amount of shift of the lens shift mechanism 116. The lens shift control section 254 controls the projection system driver 123 when operation performed on the operation panel 113 or the remote control 5 instructs lens shift of the lens unit 115 or in a case where the amount of lens shift is set in advance. The lens shift control section 254 determines the amount of action of the motor or the actuator of the lens shift mechanism 116 on the basis of the amount of movement over which the lens mount 117 is moved and notifies the lens shift mechanism 116 of the determined amount of action. The lens shift control section 254 may instead determine the amount of action of the lens shift mechanism 116, for example, on the basis the current position of the lens mount 117 and the position of the lens mount 117 after the movement. Still instead, the lens shift control section 254 may determine the amount of travel of the lens shift mechanism 116 on the basis of the amount of movement of a projection image specified by operation performed on the operation panel 131 or the remote control 5.

Figure 4:
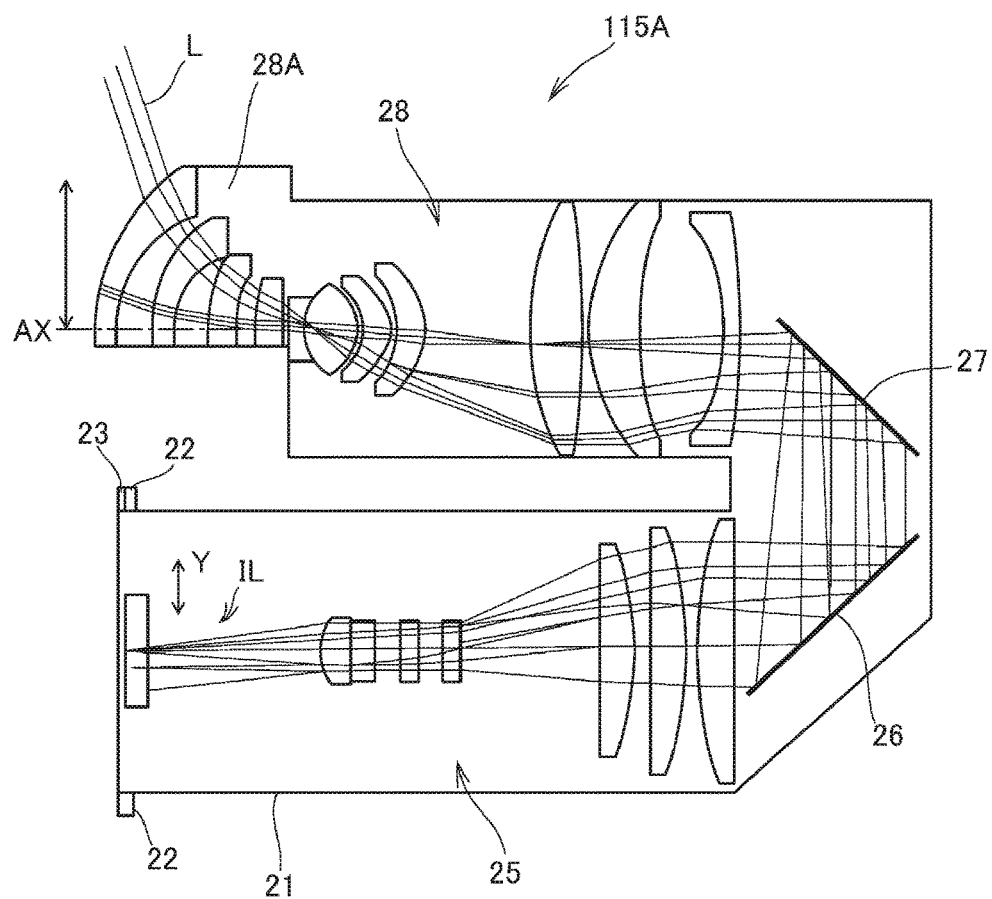
FIG. 4 is a key part cross-sectional view showing an example of the configuration of a lens unit.

FIG. 4 is a key part cross-sectional view of the lens unit 115A, which is a configuration example of the lens unit 115.

As described above, the lens unit 115 is attachable to and detachable from the lens mount 117 (FIG. 2), and any of a plurality of lens units 115 having types and structures different from one another can be selected and attached to the lens mount 117. The type of the lens unit 115 can be classified, for example, on the basis of differences in optical characteristics of the lens units 115. In this case, the optical characteristics of the projector 100 can be changed by replacing the lens unit 115 with another.

Examples of the type of the lens unit 115 may include a standard lens having standard optical characteristics, a short-focal-length lens appropriate for a case where the distance from the main body 101 to the screen SC is short, and a telephoto lens appropriate for a case where the distance from the main body 101 to the screen SC is long. For example, a projection image having an appropriate size can be projected on the screen SC by selecting one of these types of lens unit 115 in correspondence with the distance from the main body 101 to the screen SC and/or the size of the screen SC. Further, a project ion image can be projected with trapezoidal distortion corrected.

The lens unit 115A is one type of the lens unit 115 attachable to the lens mount 117 and is a short-focal-length lens unit.

A base seat 22 is disposed at the end of the lens unit 115A. The base seat 22 is, for example, a metal ring, and the lens mount 117 (FIG. 2) can be fit into the base seat 22. The lens ID memory 23 is attached to the base seat 22. The lens ID memory 23 is disposed in a position where the lens information acquisition section 124 can read the lens ID memory 23 in the state in which the base seat 22 is fixed to the lens mount 117. For example, the terminal that allows the lens information acquisition section 124 to read information from the lens ID memory 23 may be configured to come into contact with the lens ID memory 23 in the position where the base seat 22 is fixed to the lens mount 117. Instead, for example, the photosensor that allows the lens information acquisition section 124 to detect a metal piece, a resin piece, or a hole of the lens ID memory 23 may be configured to face the lens ID memory 23 in the position where the base seat 22 is fixed to the lens mount 117.

The lens unit 115A has a plurality of built-in optical elements including lenses and mirrors. The lens unit 115A has a hollow lens barrel 21, which accommodates the optical elements. In FIG. 4, alight flux that exits out of the internal optical system 114 (FIG. 2) in the main body 101 and enters the lens unit 115A is shown as incident light IL.

The optical elements of the lens unit 115A include a relay lens group 25, direction changing optical elements 26 and 27, and a wide-angle lens system 28. The relay lens group 25 is formed of a plurality of lenses and guides the incident light IL to the direction changing optical element 26. Each of the direction changing optical elements 26 and 27 is an optical element that changes the direction of the incident light IL and can be a mirror or a prism. A variety of lenses that form the lens unit 115A correspond to the projection lens according to an aspect of the invention, and the wide-angle lens system 28 and a lens group 28A, for example, correspond to the projection lens.

The incident light IL having traveled via the direction changing optical elements 26 and 27 is guided to the wide-angle lens system 28, which projects the incident light IL as image light L on the screen SC. The lens group 28A, which is located on the tail end (exit end) of the wide-angle lens system 28, has a large diameter, and each lens that forms the lens group 28A therefore has a noncircular shape having one side with respect to the optical axis AX cut off. The lens group 28A may instead be formed of a single lens.

The image light L is refracted by the wide-angle lens system 28 and radiated toward the screen SC (FIG. 2) through the lens group 28A, as shown in FIG. 4. In the lens group 28A, the image light L travels one side of the lens group 28A with respect to the optical axis AX (upper side in FIG. 4). Therefore, the lens group 28A, part of which, that is, the other side of which with respect to the optical axis AX (lower side in FIG. 4) is cut off, does not affect projection of the image light L. The weight and size of the lens unit 115A can therefore be reduced by shaping the lens group 28A in such a way that part of the circular lenses is cut off, as shown in FIG. 4.

The lens unit 115A can be replaced with a lens unit 115 having a typical focal length or a lens unit 115 including a telephoto lens. Each of these lens units 115 can be configured to include no optical elements corresponding to the direction changing optical elements 26 and 27 and have a straight tubular shape. In this case, the image light having exited out of the internal optical system 114 (FIG. 2) is projected on the screen SC with the direction of the image light unchanged.

Figure 5:
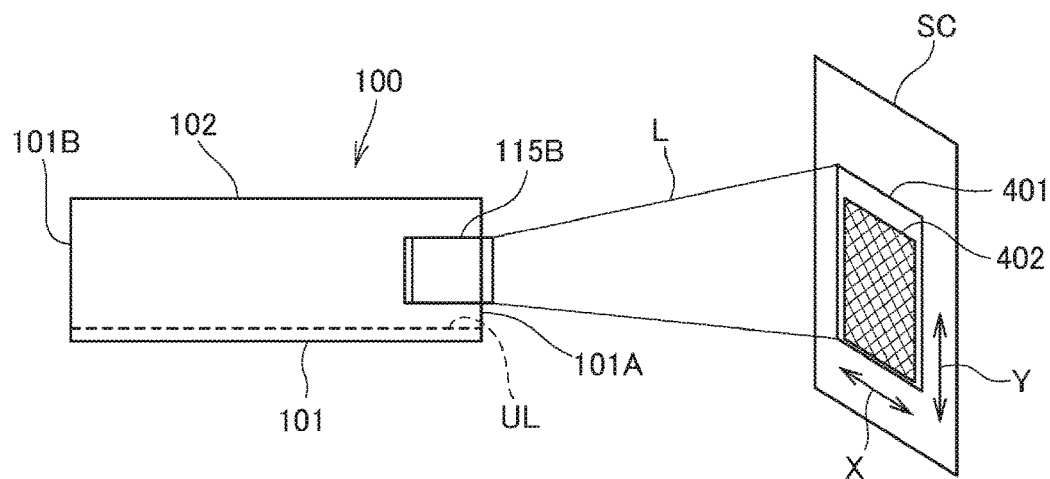
FIG. 5 shows an example of the projection state of the projector.

FIG. 5 shows an example of the projection state of the projector 100. FIG. 5 shows the projection state in a case where a straight-tubular lens unit 115B, in place of the lens unit 115A, is attached to the main body 101.

The lens unit 115B is attachable to the lens mount 117, as the lens unit 115A is. The lens unit 115B includes a built-in lens group that projects image light having exited out of the internal optical system 114 (FIG. 2) on the screen SC. The lens unit 115B, when attached to the lens mount 117, projects the image light L on the screen SC through the end portion 101A of the main body 101.

Let a projectable region 401 be a region where the image light L projected by the projector 100 can be projected (displayed) in the form of an image on the screen SC, and let a projection image 402 be the image actually displayed in the projectable region 401. The projectable region 401 is the range where the image light L can be projected on the screen SC. FIG. 5 shows an example in which the projector 100 is installed in front of the screen SC. The projectable region 401 therefore has a rectangular shape, but in a case where the projector 100 performs, for example, tilt projection, the projectable region 401 is deformed due to trapezoidal distortion.

In the present embodiment, the lens shift mechanism 116 provided in the projector 100 can move the lens mount 117 relative to the main body 101 in the upward/downward direction and the rightward/leftward direction. When the lens mount 117 is moved, the lens unit 115B is moved relative to the main body 101. Since the movement of the lens unit 115B changes the positional relationship between the image light that exits out of the internal optical system 114 (FIG. 2) and enters the lens unit 115B and the optical axis of the lens group of the lens unit 115B, the position of the projectable region 401 on the screen SC moves. Specifically, the action of the lens shift mechanism 116 moves the projectable region 401 on the screen SC in the lateral direction (horizontal direction) labeled with the reference character X and the longitudinal direction (vertical direction) labeled with the reference character Y in FIG. 5.

In FIG. 5, the broken line indicates the lower limit of the action of the lens shift mechanism 116 in the form of a lower limit position UL. The lower limit position UL is the lowest position of the lens mount 117 moved by the lens shift mechanism 116. The lower limit position UL may be considered as the lower limit position of the lens mount 117 or the lower limit position of the lens unit 115.

Figure 6:
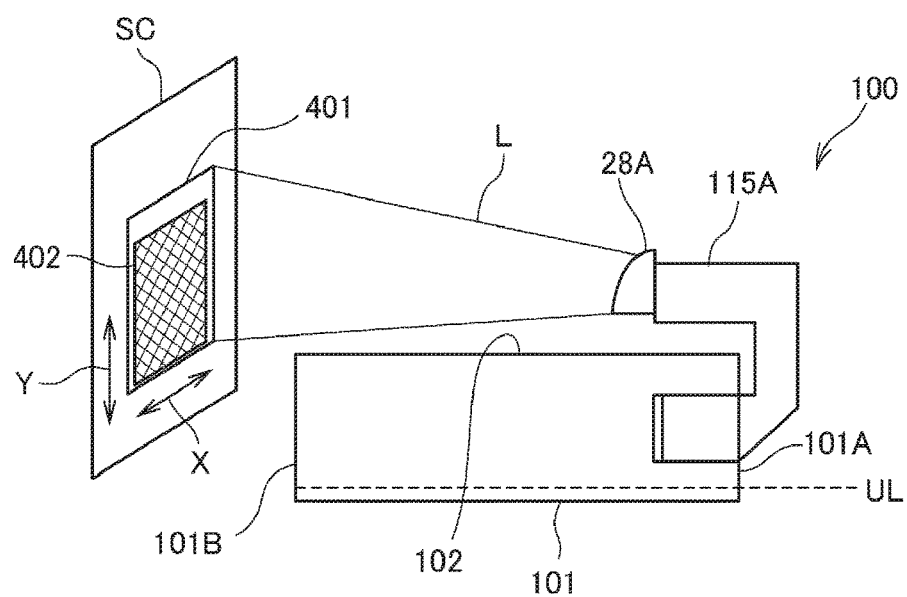
FIG. 6 shows an example of the projection state of the projector.

FIG. 6 shows another example of the projection state of the projector 100. FIG. 6 shows the projection state in the case where the lens unit 115A is attached to the main body 101.

The lens unit 115A changes the direction in which the image light exits out of the internal optical system 114 (FIG. 2) in the main body 101 and projects the image light on the screen SC. The lens unit 115A projects the image light L in the direction from the end portion 101A toward the end portion 101B. Therefore, to use the lens unit 115A, the projector 100 is installed in an orientation that allows the end portion 101B to be close to the screen SC.

The lens unit 115A, which changes the direction of the incident light IL exiting out of the internal optical system 114 as described with reference to FIG. 4, can project the image light L in the direction from the end portion 101A toward the end portion 101B, as shown in FIG. 6. In the installation state described above, since the main body 101 is located between the lens group 28A and the screen SC, a necessary distance between the lens group 28A and the screen SC can be ensured, and the main body 101 is allowed to be close to the screen SC. The area necessary for installation of the projector 100 can therefore be reduced.

Also in the example shown in FIG. 6, when the lens shift mechanism 116 moves the lens mount 117, the positional relationship between the incident light IL (FIG. 4) that exits out of the internal optical system 114 (FIG. 2) and enters the lens unit 115A and the optical axis of the lens group of the lens unit 115A changes. As a result, the position of the projectable region 401 on the screen SC moves in the directions indicated by reference characters X and Y in FIG. 6. The lower limit of the range over which the lens shift mechanism 116 can move the lens unit 115A is the lower limit position UL. In the state shown in FIG. 6, the lens unit 115A is located above the lower limit position UL.

Figure 7:
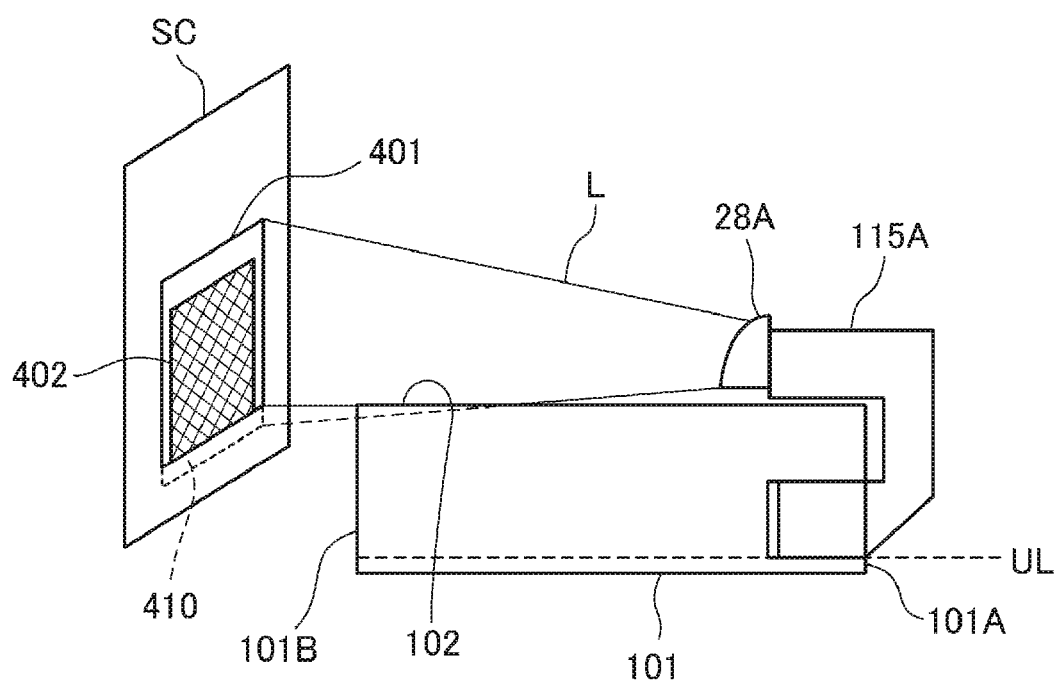
FIG. 7 shows an example of the projection state of the projector.

FIG. 7 shows another example of the projection state of the projector 100. FIG. 7 shows an example in which the lens unit 115A is attached to the projection 100 and the lens unit 115A is moved downward by a greater amount than in the state shown in FIG. 6.

When the lens unit 115A is moved downward, the lens group 28A approaches the upper surface 102 of the main body 101. The range over which the image light L is radiated is likely to cross the upper surface 102 depending on the degree of spread of the image light L projected through the lens group 28A toward the screen SC and the distance between the upper surface 102 and the lens group 28A.

Since the lens unit 115A includes a short-focal-length lens, the range over which the image light L is radiated through the lens group 28A is wider, for example, than the range over which the image light is radiated through the lens unit 115B. Further, since the lens unit 115A projects the image light L through the end portion 101A toward the end portion 101B, the radiation range of the image light L is highly likely to cross the upper surface 102.

The example shown in FIG. 7 shows a state in which part of the image light L impinges on the upper surface 102. In this state, since part of the image light L is blocked by the upper surface 102, part of the projectable region 401 forms a lost portion 410. The phenomenon in which the upper surface 102 blocks part of the image light L is known as mechanical vignetting or simply vignetting. It can, for example, be said that the phenomenon described above is a phenomenon in which part of an image projected on the screen SC cannot be visually recognized because an object present on the optical path to the screen SC partially blocks the light having exited out of the lens unit. The lost portion 410 produced due to the vignetting is a portion where no image light L reaches the screen SC, that is, a portion irradiated with no image light L. In a case where the lost portion 410 overlaps with the projection image 402, part of the projection image 402 is undesirably lost.

In this case, a problem of improper projection of the projection image 402 occurs. Further, since the image light L is reflected off the upper surface 102, there is a concern about influence of the reflection light in an unintended direction.

Further, it is conceivable that when the lens shift mechanism 116 moves the lens mount 117, the image light in the lens unit 115 deviates from the image circle of the lens unit 115.

For example, in FIG. 4, which shows the lens unit 115A, when the lens shift mechanism 116 moves the lens unit 115A in the upward/downward direction, the position of the incident light IL relative to the optical axis of the relay lens group 25 moves in the direction labeled with Y. As a result, the position of the incident light IL relative to the optical axis of the wide-angle lens system 28 (including lens group 28A) also moves.

In this case, it is conceivable that the incident light IL deviates from the image circles of the relay lens group 25 and/or the wide-angle lens system 28. The lens unit 115A is a short-focal-length lens unit and includes a wide-angle lens. Since the lens unit 115A therefore has a small image circle as compared with the diameters of the lenses in the lens unit 115A, the image light tends to deviate from the image circle. Further, for example, in the lens unit 115A shown in FIG. 4, the lens group 28A has a shape having one side with respect to the optical axis AX cut off. Shifting the position of the lens unit 115A is therefore likely to cause the image light to deviate from the image circle of the lens group 28A.

The light having deviated from the image circle of the lenses that form the lens unit 115 radiates the circumference of the lenses of the lens unit 115. For example, in the lens unit 115A (FIG. 4), the light having deviated from the image circle of the lenses radiates the inner surface of the lens barrel 21. As a result, in a case where a large amount of light deviates from the image circle of the lenses, the temperature of the lens barrel 21 undesirably increases in some cases. Increase in the temperature of the lens barrel 21 is not preferable. For example, in a case where the lens unit 115A includes a resin lens, extreme increase in the temperature should be avoided.

When the lens shift mechanism 116 moves (shifts) the position of the lens unit 115, the projector 100 carries out the process of avoiding or reducing the influence of the vignetting resulting from the upper surface 102 and the light having deviated from the image circle.

Figure 8:
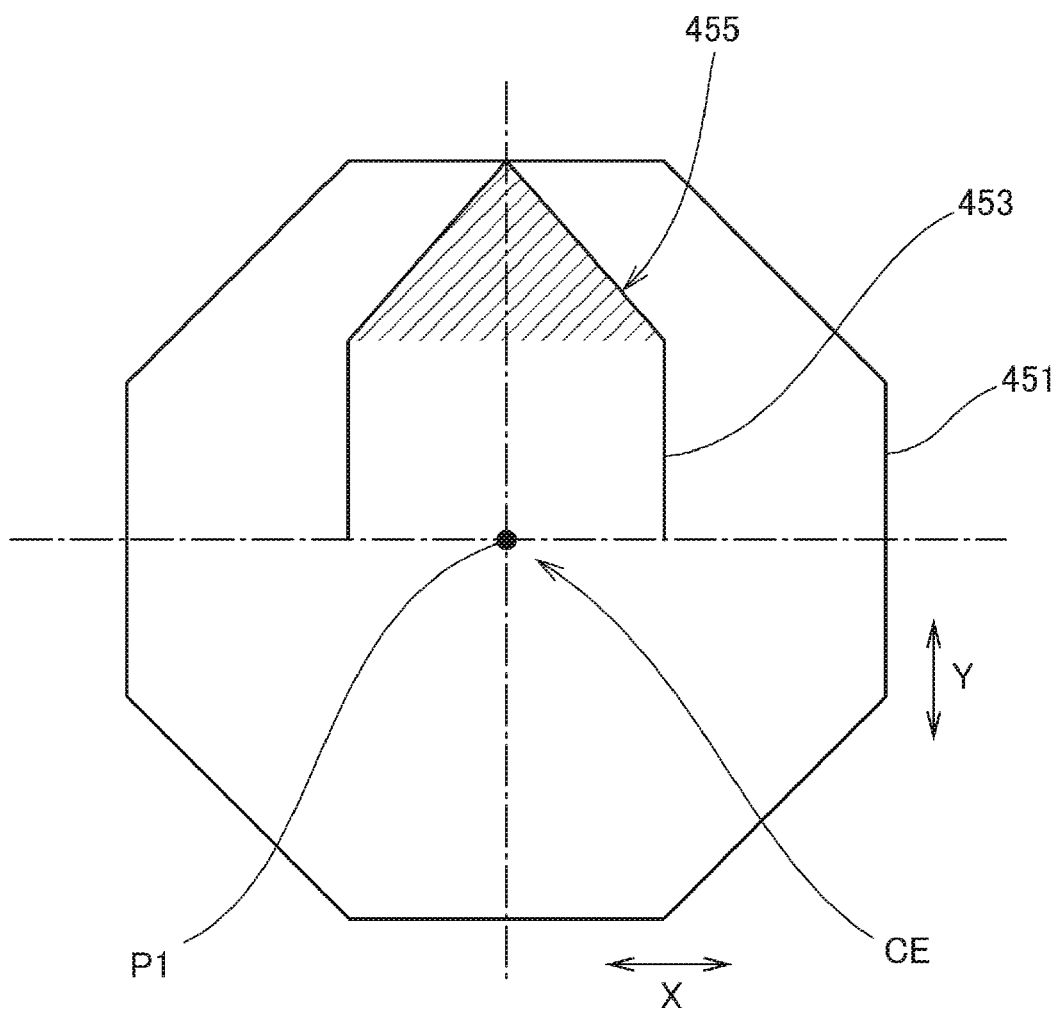
FIG. 8 shows the action range of a lens shift mechanism.

FIG. 8 shows the position of the lens mount 117 shifted by the lens shift mechanism 116. In FIG. 8, the point P1 shows the position of the lens mount 117, and the solid line shows the range over which the position P1 can move.

The projector 100 according to the present embodiment can move the lens mount 117 relative to the main body 101 in the lateral direction (horizontal direction) and the longitudinal direction (vertical direction). That is, the direction in which the lens mount 117 is moved is the lateral direction labeled with the reference character X and the longitudinal direction labeled with the reference character Y in FIG. 8. The position P1 represents the position of the lens mount 117 in the form of a point, for example, represents the position of the center of the lens mount 117.

The center CE of a movement range 451 is a reference position of the lens mount 117. For example, to attach or detach the lens unit 115 to or from the lens mount 117, it is recommended that the position P1 of the lens mount 117 coincides with the position of the center CE, which is the reference position. For example, to detach the lens unit 115, the lens mount 117 is moved, before the detachment, in accordance with operation performed on the remote control 5 or the operation panel 131 until the position P1 reaches the center CE. The optical characteristics and specifications of the lens unit 115 may instead be so set that the lens unit 115 can be attached and detached in a position where the position P1 of the lens mount 117 deviates from the center CE.

The movement range 451 represents the range over which the lens mount 117 is movable. The movement range 451 is a movement range set in accordance with the limitation or specifications of the mechanical structures of the lens shift mechanism 116 and the lens mount 117. In other words, the maximum range over which the lens mount 117 is movable corresponds to the movement range 451. For example, in a case where a typical lens unit 115 (lens unit 115B, for example) except a short-focal-length lens unit and a telephoto lens unit is attached to the projector 100, the lens mount 117 can be moved to a position where the position P1 falls within the movement range 451.

For example, in the state in which the short-focal-length lens unit 115A is attached to the lens mount 117, the range over which the lens mount 117 is movable is smaller than the movement range 451. Specifically, the position P1 is limited to positions within movement ranges 453 and 455. When the position P1 falls within the movement range 455 indicated by the oblique lines in FIG. 8, 100% of the image light L projected via the lens unit 115A can be projected on the screen SC.

It can therefore be said that the movement range 451 contains positions P1 appropriate for the typical lens unit 115. It can also be said that the movement range 455 contains positions P1 appropriate for the short-focal-length lens unit 115A.

Further, the movement range 453 is a movement range used when the lens unit is replaced and used to move the position P1 to the center CE. When the position P1 falls within the movement range 453, at least 50% of the projectable region 401 (FIG. 6) can be properly projected on the screen SC. That is, in a state in which the position P1 is out of the movement range 455 but falls within the movement range 453, at least part of the image light modulated by the light modulator 112 is not projected on the screen SC. The light that is not projected on the screen SC is specifically light resulting from vignetting caused by the upper surface 102 and/or deviation of the incident light IL from the projectable range of the wide-angle lens system 28 and corresponds to 50% of the projectable region 401 at the maximum.

The position and the amount of movement of the lens mount 117 moved by the lens shift mechanism 116 are controlled by the lens shift control section 254 of the control section 250. For example, the storage section 207 stores data representing the movement ranges 451, 453, and 455 and the center CE shown in FIG. 8 by way of example, and the lens shift control section 254 controls the lens shift mechanism 116 on the basis of the data stored in the storage section 207.

The movement ranges 451, 453, and 455 correspond to the lens unit 115 and represent the range of appropriate positions of the lens unit 117 at the time when the lens unit 115 is used. The storage section 207 therefore preferably stores data on the movement range 451, 453, or 455 in correspondence with the lens unit 115. For example, the storage section 207 may store data representing the size, position, shape, and other factors of the movement range in relation to the lens ID of the lens unit 115. Instead, the lens information 207A may contain data representing the size, position, shape, and other factors of the movement range. Still instead, for the types or the lens IDs of a plurality of lenses, the storage section 207 may store data representing the size, position, shape, and other factors of the movement range corresponding to the type or the lens ID of each of the lenses, for example, in the form of a table. The configuration described above allows the control section 250 to obtain, on the basis of the lens ID recorded in the lens ID memory 23 of the lens unit 115, data on the movement range corresponding to the lens unit 115. Therefore, for the lens unit 115 attached to the lens mount 117, the control section 250 can determine the range of an appropriate position (position P1) of the lens mount 117.

For example, in a case where the movement range is set in correspondence with the vignetting caused by the upper surface 102, the movement range is affected by the aspect of the vignetting, that is, the shape of the main body 101 and the angle of the image light L projected by the lens unit 115. On the other hand, in a case where the movement range is set in correspondence with deviation of the image light from the image circle of the wide-angle lens system 28, the size and shape of the movement range is affected by the image circle of the lens, the focal length of the lens, and other factors.

The lens shift control section 254 can compare the position P1 with the positions in the movement ranges 451, 453, and 455 to evaluate, for example, whether or not the position P1 falls within the movement range 451. Similarly, the lens shift control section 254 can evaluate whether or not the position P1 falls within the movement range 455.

The projector 100 according to the present embodiment causes the lens shift control section 254 to evaluate whether or not the position P1 of the lens mount 117 is an appropriate position. When the position P1 is not an appropriate position, the projector 100 causes the image drawing control section 252 to control the image drawing range of the light modulator 112 to suppress the influence of the light reflected off the upper surface 102 and the light that deviates from the image circle of the wide-angle lens system 28.

Figure 9:
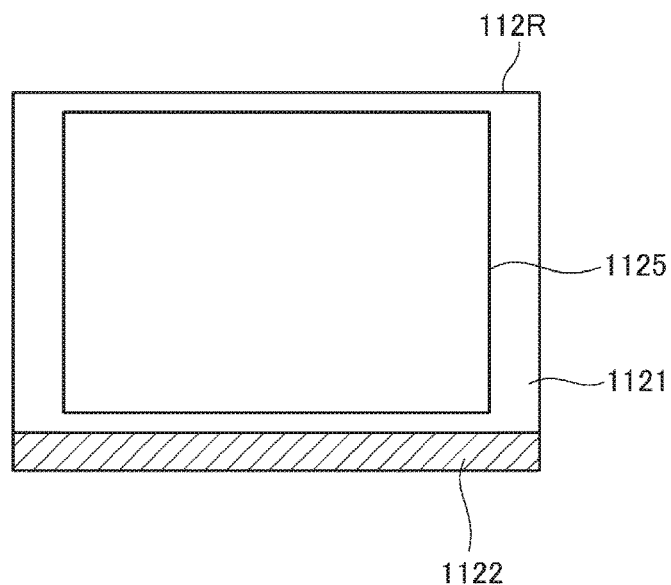
FIG. 9 is a diagrammatic view showing an example of the configuration of an image drawing region of a light modulator.

FIG. 9 is a diagrammatic view showing an example of the configuration of the image drawing region of the light modulator 112 and shows the liquid crystal panel 112R by way of example among the three liquid crystal panels 112R, 112G, and 112B provided in the light modulator 112.

An image drawing region 1121 which forms the liquid crystal panel 112R and where the pixels are arranged is a region where a pixel value (grayscale) is set at each pixel for image drawing and corresponds to what is called an image drawable region. In the image drawing region 1121, an image region 1125, where an image is actually drawn, is determined in accordance with the size, the resolution, the number of pixels, and other factors of the image. Although not shown, also in the liquid crystal panels 112G and 112B, image drawable regions are provided as the image drawing region 1121 is, and images can be drawn in the image drawable regions.

When the lens shift control section 254 determines that the position P1 of the lens mount 117 is not an appropriate position, the image drawing control section 252 sets part of the image region 1125 to be an unused region and sets the grayscales of the pixel values therein. Specifically, the image drawing control section 252 sets a suppression region 1122 in the image drawing region 1121. The suppression region 1122 is a region where the amount of image light (modulated light) outputted from the liquid crystal panel 112R is suppressed, and the grayscale at the pixels in the suppression region 1122 is, for example, "0". In each of the liquid crystal panels 112G and 112B, the suppression region 1122 can be similarly provided, and the grayscale at the pixels contained in the suppression region 1122 is set at "0".

The pixel value in the suppression region 1122 is controlled by the image drawing control section 252, and even in a case where the image region 1125 overlaps with the suppression region 1122, the pixel value in the suppression region 1122 is maintained at a value that suppresses the amount of image light.

The position, size, and shape of the suppression region 1122 are not limited to those in the example shown in FIG. 9. For example, a suppression region 1122 having a position, a size, and a shape corresponding to the image light part of which is blocked by the upper surface 102 can be set. Instead, a suppression region 1122 having a position, a size, and a shape corresponding to the light that deviates from the image circle can be set in correspondence with the positional relationship between the image circle of the wide-angle lens system 28 and the incident light IL (FIG. 4).

Figure 10:
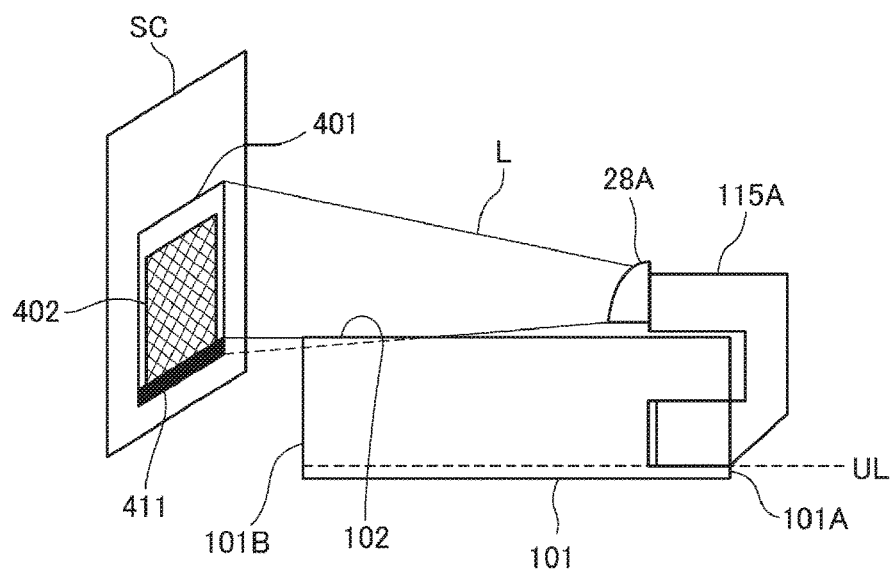
FIG. 10 shows an example of the projection state of the projector.
Figure 11:
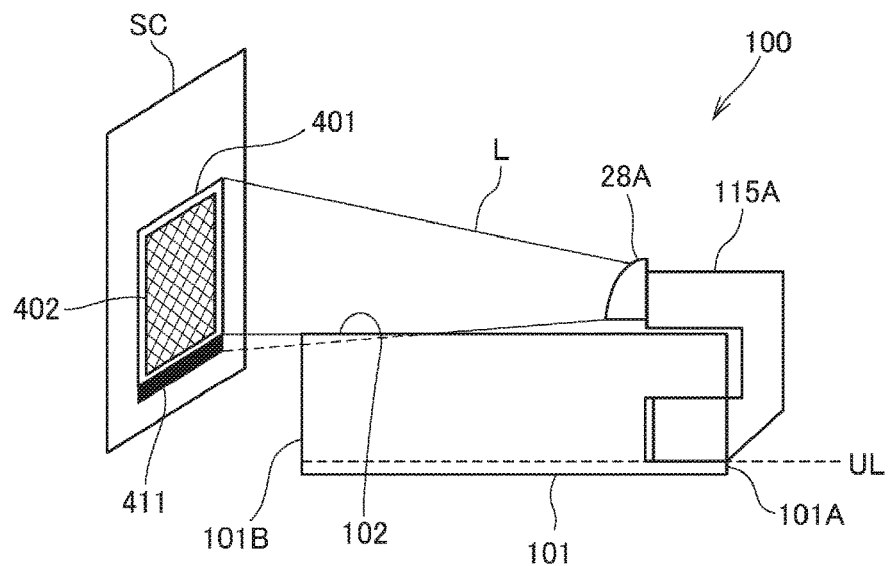
FIG. 11 shows an example of the projection state of the projector.

FIGS. 10 and 11 show examples of the projection state of the projector 100 in the case where the suppression region 1122 is set in the light modulator 112.

In the example shown in FIG. 10, the suppression region 1122 is set in correspondence with the region where part of the projectable region 401 is lost due to the vignetting caused by the upper surface 102, that is, the lost portion 410 (FIG. 7). In this case, since a solid black image is displayed in the suppression region 1122, a black display portion 411 corresponding to the suppression region 1122 appears on the screen SC. In the black display portion 411, the screen SC is irradiated with no light. The projection image 402 that appears on the screen SC therefore has the same state shown in FIG. 7, in which the projection image 402 has the lost portion 410. However, since the amount of reflected light in the projection image 402 and the amount of light that deviates from the image circle of the wide-angle lens system 28 can be reduced, whereby the influence of the unnecessary reflected light, overheat of the lens unit 115A, and other problems can be avoided.

FIG. 11 shows an example in which the suppression region 1122 is set in the image drawing region 1121 of the light modulator 112 and the image region 1125 is moved. In the case where the image region 1125 overlaps with the suppression region 1122, the grayscale in the suppression region 1122 is set irrespective of the image region 1125, as described above. That is, since no image is allowed to be drawn in the suppression region 1122, the image region 1125 is set in a position where the image region 1125 does not overlap with the suppression region 1122, whereby an image can be drawn with no lost portion. In this case, the projection image 402 is disposed in the projectable region 401 and in a position where the projection image 402 does not overlap with the black display portion 411, as shown in FIG. 11. The projection image 402 can therefore be formed with no lost portion on the screen SC.

In a case where the projector 100 is not located in front of the screen SC, trapezoidal distortion occurs in accordance with the angle between the optical axis of the projector 100 and the screen SC. The projector 100 may have a geometric correction function. In this case, to correct the trapezoidal distortion, the projector 100 deforms the image region 1125 of the liquid crystal panel 112R to a shape that compensates the distortion of the projection image 402. For example, the control section 250 forms the suppression region 1122 in the image drawing region 1121 and places the image region 1125 in a position where the image region 1125 does not overlap with the suppression region 1122. As a result, in the case where the trapezoidal distortion is corrected, the projection image 402 can be formed with no lost portion on the screen SC.

The lost portion 410 shown in FIG. 7 has a rectangular shape, but the actual shape of the lost portion 410 varies in accordance with the shape of the main body 101, the projection angle at which the lens unit 115 projects the image light L, the distance between the lens group 28A and the upper surface 102, and other factors. Therefore, the lost portion 410 does not necessarily have a rectangular shape and has a variety of sizes. The black display portion 411 is preferably formed in accordance with the size and shape of the lost portion 410. The shape of the black display portion 411, that is, the shape of the suppression region 1122 is therefore also not limited to a rectangular shape. The black display portion 411 preferably contains the entirety or majority of the lost portion 410. The black display portion 411 may contain the lost portion 410, or the black display portion 411 may contain a portion other than the lost portion 410. The image drawing control section 252 determines the position, size, and shape of the suppression region 1122 in correspondence with the lost portion 410.

Figure 12:
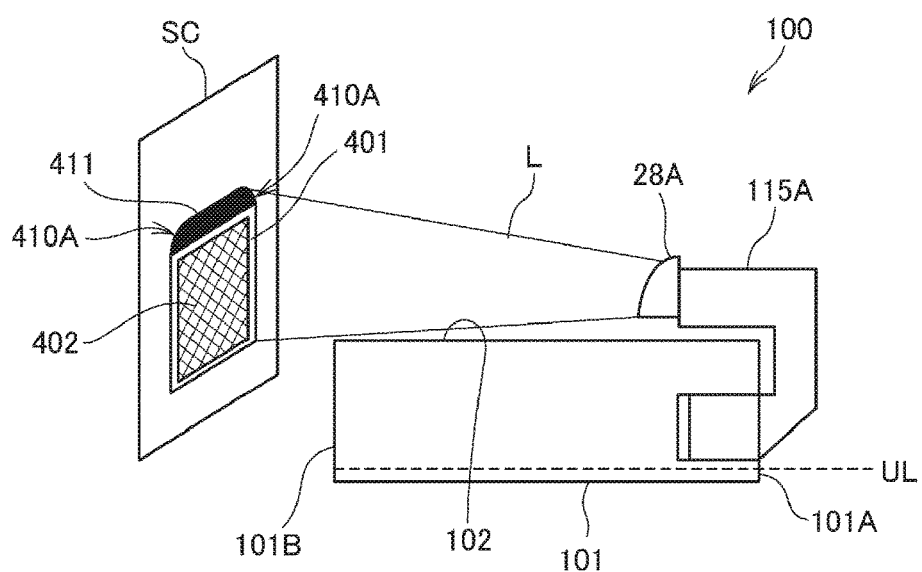
FIG. 12 shows an example of the projection state of the projector.

FIG. 12 shows another example of the projection state of the projector 100 in the case where the suppression region 1122 is set in the light modulator 112.

In the example shown in FIG. 12, lost portions 410A occur at the upper corners of the projection image 402 on the screen SC due to deviation of part of the image light L from the image circle of the lens group 28A. The lost portions 410A each have a shape that follows the edge of the image circle of the lens group 28A, and the right and left corners of an upper portion of the projectable region 401 are therefore arcuately lost.

The phenomenon shown by way of example in FIG. 12 can occur when the lens unit 115A is shifted in a case where the image circle of the lens unit 115A is small with respect to the specifications of the light modulator 112. In this case, an image can be partially projected although it cannot be said that the specifications of the light modulator 112 and the lens unit 115A are appropriate. The projector 100 can address the problem of the occurrence of the arcuately lost portions 410A by setting the suppression region 1122 in the image drawing region 1121 of the light modulator 112.

Specifically, the projector 100 sets a suppression region 1122 including the arcuate portions of the lost portions 410A and a region connected to the arcuate portions and draws a rectangular image drawing region. In this case, the black display portion 411 contains a portion other than the lost portions 410A, and the projection image 402 has a rectangular shape, as shown in FIG. 12. The process described above allows the rectangular projection image 402 to be projected even if the image light L partially deviates from the image circle so that the projectable region 401 does not have a rectangular shape.

In the example described above, only one side of the image display region is provided with the black display portion 411, but the position where the black display portion 411 is provided, that is, the position where the suppression region 1122 is set is not limited to the example described above. For example, providing each of the two sides of the image display region that intersect the one side thereof with a black display portion allows the aspect ratio of the image display region to remain unchanged.

As described in the example shown in FIG. 11, in the case where the suppression region 1122 is set in the image drawing region 1121 of the light modulator 112, an image can be drawn with no lost portion by moving the image region 1125. Therefore, even when arcuate vignetting occurs as shown in FIG. 12, the rectangular projection image 402 can be formed with no lost portion on the screen SC.

The image drawing control section 252 determines the position, size and the shape of the suppression region 1122 on the basis of the type of the lens unit 115, the data stored in advance in the storage section 207, and the position of the lens unit 115. The position of the lens unit 115 is the position relative to the position of the main body 101 and corresponds to the position P1 shown in FIG. 8. When the lost portion 410 occurs due to vignetting caused by the upper surface 102, the shape and size of the lost portion 410 reflect the shape and other factors of the main body 101.

As a typical example, the storage section 207 stores the data for determining the position, size, and shape of the suppression region 1122 on the basis of the type of the lens unit 115 and the position P1. The data may, for example, be a function, parameters, a determinant, or a program for performing computation based on the type of the lens unit 115 and the position P1. The data may instead be data in the form of a table containing positions, sizes, and shapes of the suppression region 1122 that correspond to the types of the lens unit 115 and the positions P1. The type of the lens unit 115 may, for example, be the lens ID acquired by the lens information acquisition section 124 from the lens ID memory 23. Instead, the storage section 207 may store one set of data for determining the positions, sizes, and shapes of the suppression region 1122 in correspondence with a plurality of lens IDs.

Figure 13:
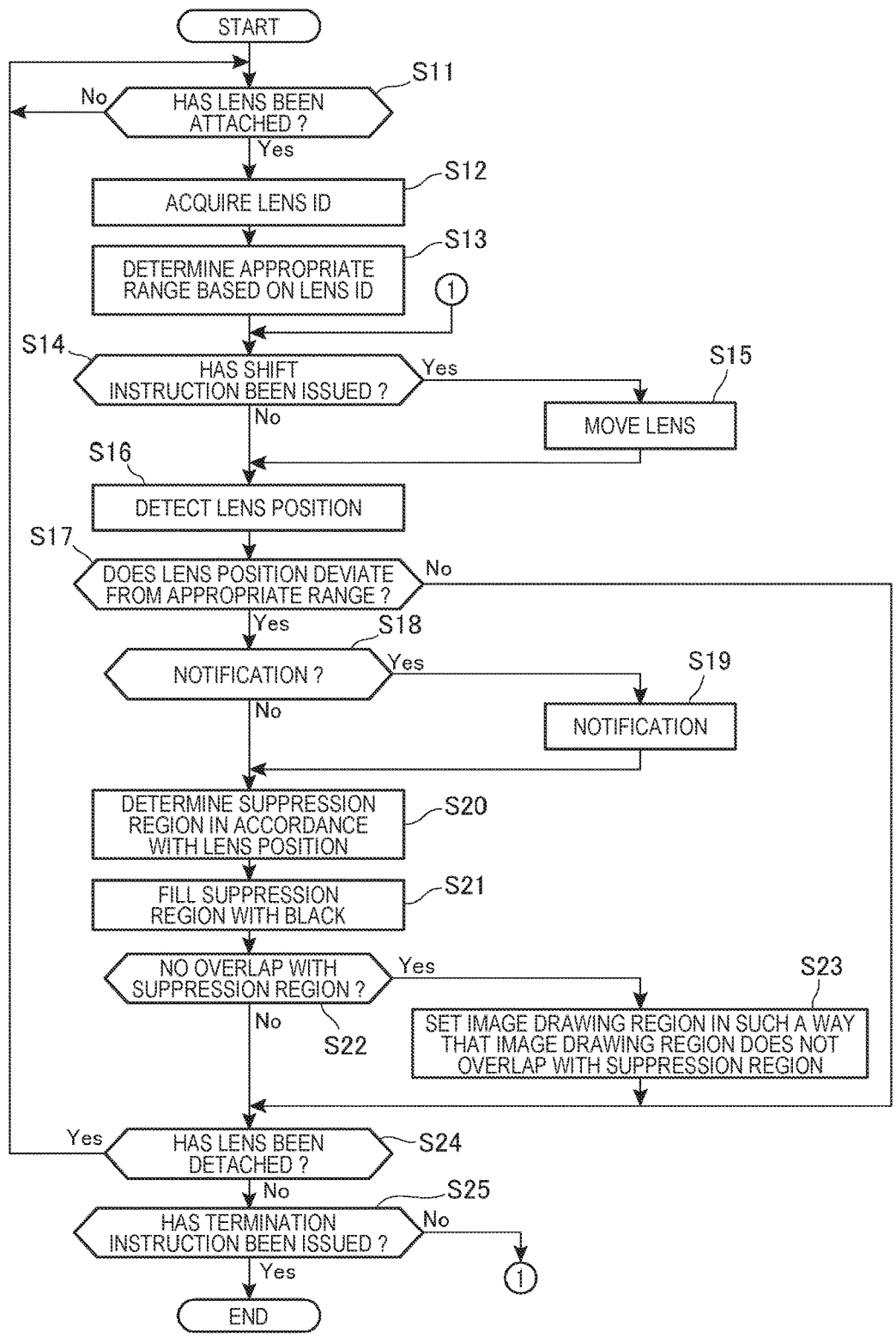
FIG. 13 is a flowchart showing the action of the projector.

FIG. 13 is a flowchart showing the action of the projector 100.

The control section 250 evaluates whether or not the lens unit 115 has been attached to the lens mount 117 (step S11). For example, the control section 250 evaluates whether or not the lens unit 115 is present on the basis of whether or not the lens ID of the lens unit 115 attached to the lens mount 117 can be read by the lens information acquisition section 124. In a case where no lens unit 115 has been attached (No in step S11), the control section 250 waits until the lens unit 115 is attached. In a case where a result of the evaluation shows that the lens unit 115 has been attached (Yes in step S11), the control section 250 causes the lens information acquisition section 124 to acquire the lens ID from the lens ID memory 23 (step S12).

The control section 250 refers to the lens information 207A corresponding to the lens ID acquired from the lens ID memory 23 and determines an appropriate range (shift range) as the position of the lens mount 117 (step S13).

The control section 250 then evaluates whether or not operation performed on the remote control 5 or the operation panel 131 has instructed lens shift of the lens unit 115 (step S14). In a case where lens shift instruction has been issued (Yes in step S14), the control section 250 drives the lens shift mechanism 116 in accordance with the instruction to move (shift) the lens mount 117 (step S15) and proceeds to step S16. In a case where no lens shift instruction has been issued (No in step S14), the control section 250 proceeds to step S16.

In step S16, the control section 250 detects the position of the lens mount 117 (step S16). The position of the lens mount 117 may be detected, for example, by a detector (not shown) that detects the position of the lens mount 117 or by computation based on the amount of action of the lens shift mechanism 116. The detector is a sensor, a rotary encoder, or any other component that detects the position or the amount of drive of the actuator or the motor of the lens shift mechanism 116.

The control section 250 evaluates whether or not the position of the lens mount 117 detected in step S16 deviates from the appropriate range determined in step S13 (step S17). In a case where the position falls within the appropriate range (No in step S17), the control section 250 proceeds to step 24, which will be described later.

In a case where the position of the lens mount 117 deviates from the appropriate range (Yes in step S17), the control section 250 evaluates whether or not notification is made (step S18). The control section 250 can make notification, for example, by a method for displaying an image or a text that advises that part of the projection image 402 is likely to be lost, a method for outputting the advice described above in the form of voice, or a method for causing an indicator on the operation panel 131 to blink. Whether or not the notification is made may be determined, for example, in accordance with a setting made in advance. For example, the control section 250 can determine whether or not the notification needs to be made on the basis of the lens information 207A. In this case, the lens information 207A only needs to contain information representing whether or not the notification needs to be made in relation to the lens ID. Instead, the user's instruction of whether or not the notification is made may be asked in step S18.

In a case where a result of the evaluation shows that the notification is made (Yes in step S18), the control section 250 makes the notification based, for example, on any of the methods described above (step S19) and proceeds to step S20. In a case where a result of the evaluation shows that no notification is made (No in step S18), the control section 250 proceeds to step S20.

In step S20, the control section 250 determines the suppression region corresponding to the lens position detected in step S16 (step S20). That is, in step S20, the control section 250 determines the position, size, shape, and other factors of the region which forms the image drawing region of the light modulator 112 and where the amount of light is suppressed, as in the case of the suppression region 1122 (FIG. 9).

The control section 250 carries out the process of filling the suppression region determined in step S20 with black (step S21). The control section 250 subsequently evaluates whether or not the process of drawing an image in such a way that the image does not overlap with the suppression region is carried out (step S22). The process is specifically the process of drawing the image region 1125 by using a position and a size that prevents the image region 1125 from overlapping with the suppression region 1122, as described with reference to FIG. 9. The control section 250 performs the evaluation in accordance, for example, with a setting made in advance or an input from the remote control 5 or the operation panel 131. In a case where a result of the evaluation shows that the process of drawing an image in such a way that the image does not overlap with the suppression region is carried out (Yes in step S22), the control section 250 controls the light modulator driver 122 to cause it to draw the image in such a way that the image does not overlap with the suppression region (step S23) and proceeds to step S24. In a case where a result of the evaluation shows that the process described above is not carried out (No in step S22), the control section 250 proceeds to step S24.

In step S24, the control section 250 evaluates whether or not the lens unit 115 has been detached from the lens mount 117 (step S24). In a case where the lens unit 115 has been detached (Yes in step S24), the control section 250 returns to step S11. At this point, the control section 250 may initialize the position of the lens mount 117, the setting on the suppression region 1122, and other factors and proceed to step S11.

In a case where the lens unit 115 has not been detached (No in step S24), the control section 250 evaluates whether or not operation performed on the remote control 5 or the operation panel 131 has instructed projection termination (step S25). In a case where the projection termination instruction has been issued (Yes in step S25), the control section 250 terminates the entire procedure. In a case where no projection termination instruction has been issued (No in step S25), the control section 250 returns to step S14.

As described above, the projector 100 according to the first embodiment to which the invention is applied includes the light source 111 and the light modulator 112, which has the image drawing region 1121, where an image can be drawn, and modulates light emitted from the light source 111 in accordance with an image drawn in the image drawing region 1121. The projector 100 further includes the projection system 113, which includes the lens unit 115 and projects image light modulated by the light modulator 112. The projector 100 further includes the lens shift mechanism 116, which moves the lens unit 115 in the direction perpendicular to the optical axis of the lens unit 115 or the optical axis of a lens or any other optical part provided in the lens unit 115. The projector 100 further includes the control section 250, which controls the image drawing performed by the light modulator 112. The control section 250 provides the image drawing region 1121 of the light modulator 112 with the suppression region 1122, where the amount of image light is suppressed, on the basis of the position of the lens unit 115. According to the configuration of the projector 100 or the method for controlling the projector 100, even if part of a projection image is lost due to the positional relationship of the structure of the main body 101 and the optical design of the projector 100 with the optical axis of the lens unit 115, an image can be projected by using a range where no loss occurs. For example, part of the projection image 402 on the screen SC becomes the lost portion 410 when the upper surface 102 causes vignetting or the image light deviates from the image circle of a lens in the lens unit 115. In this case, the black display portion 411 corresponding to the lost portion 410 is so formed that the amount of image light corresponding to the lost portion 410 is suppressed. Since the light modulator 112 suppresses the amount of light projected in an improper direction as described above, adverse effects due to the improper light can be avoided or suppressed. Effects and problems due to loss of part of a projection image can therefore be avoided or suppressed in such a way that the convenience of the projector is not compromised.

The projector 100 further includes the interface section 201, and the control section 250 draws an image based on image data acquired via the interface section 201 in the image drawing region 1121 and in a position where the image does not overlap with the suppression region 1122. For example, the image drawing control section 252 can place the image region 1125 in the image drawing region 1121 in such a way that the image region 1125 does not overlap with the suppression region 1122 and draw an image in the thus placed image region 1125 on the basis of the image data acquired via the interface section 201. Further, the entirety of an image drawn in the frame memory 105 by the image processing section 203 can be projected with no lost portion by placing the image region 1125 in a region other than the suppression region 1122.

The control section 250 fills the suppression region 1122 with a predetermined color other than colors in the image based on the image data. As an example, the grayscale at each pixel in the suppression region 1122 is set at zero. Setting the zero grayscale in the liquid crystal panels corresponding to the three colors, R, G, and B, as in the projector 100 according to the present embodiment, allows display of black pixels in the suppression region 1122. The pixel value of the pixels in the suppression region 1122 is not limited to zero and only needs to be a grayscale lower than a predetermined value set in advance. The amount of light projected in an improper direction can thus be suppressed.

The projector 100 further includes the lens mount 117, which detachably fixes the lens unit 115. The control section 250 includes the lens identification section 253, which identifies the type of the lens unit 115 fixed to the lens mount 117. The control section 250 provides the image drawing region 1121 of the light modulator 112 with the suppression region 1122, where the amount of image light is suppressed, on the basis of the position of the lens unit 115 and the type of the lens unit 115 determined by the lens identification section 253. As a result, the amount of light projected in an improper direction and blocked by the projection lens, the main body of the projector, an accessary of the projector, or any other object can be reduced. Heat generation and other undesirable phenomena due to the blocked light can therefore be suppressed. Further, for example, in the case of the lens unit 115 is replaced, the projector 100, which places the image region in such a way that the image region does not overlap with the suppression region, can address the problem of loss of part of a projection image resulting from the positional relationship of the structure of the main body 101 and the optical design of the projector 100 with the optical axis of the lens unit 115.

Further, in the configuration of the projector 100, the center of the image circle of the wide-angle lens system 28 provided in the lens unit 115 is shifted toward one side from the center of the image drawing region 1121, as shown in FIG. 4. In this case, in the case where the image light deviates from the image circle, the provided suppression region 1122 allows suppression of the amount of the deviating light. As described above, in a configuration in which loss of part of an image tends to occur, as in the case of what is called a short-focal-length lens, suppressing the amount of light projected in an improper direction allows prevention or suppression of radiation of the light in an unintended direction.

The lens unit 115 can be configured to include the lens group 28A including non-circular lenses that provide an image circle part of which is cut off, as shown in FIG. 4.

In this case, the lens unit 115 can be configured to include the lens barrel 21, which accommodates the lenses. That is, the lens unit 115 can be configured to include the non-circular lenses each having a roughly circular outer shape part of which is cut off. According to the configuration, the light modulator 112 can suppress light that deviates from the image circle of the lenses, whereby effects of irradiation of the interior of the main body 101 and the interior of the lens barrel 21 with the light that deviates from the image circle can be suppressed. The lens unit 115 can instead be configured to include non-circular mirrors each having a roughly circular outer shape part of which is cut off. Also in this case, the light modulator 112 can suppress light that deviates from the reflection surfaces of the mirrors, whereby effects of irradiation of the interior of the main body 101 and the interior of the lens barrel 21 with the light in an unintended position can be suppressed.

The projector 100 further includes the main body 101, which accommodates at least the light source 111 and the light modulator 112. The projection system 113 can be configured to include the lens unit 115, which radiates the image light through the end portion 101A, which is located on one side of the main body 101, toward the end portion 101B, which is located on the other side. In this case, the control section 250 can provide the image drawing region 1121 of the light modulator 112 with the suppression region 1122 in a position corresponding to the image light with which the surface of the main body 101 is irradiated via the projection system 113. According to the configuration described above, when vignetting occurs, the amount of light blocked by the main body 101 can be reduced, and an image can be projected within a range where the image light is not blocked by the main body 101.

Second Embodiment

Figure 14:
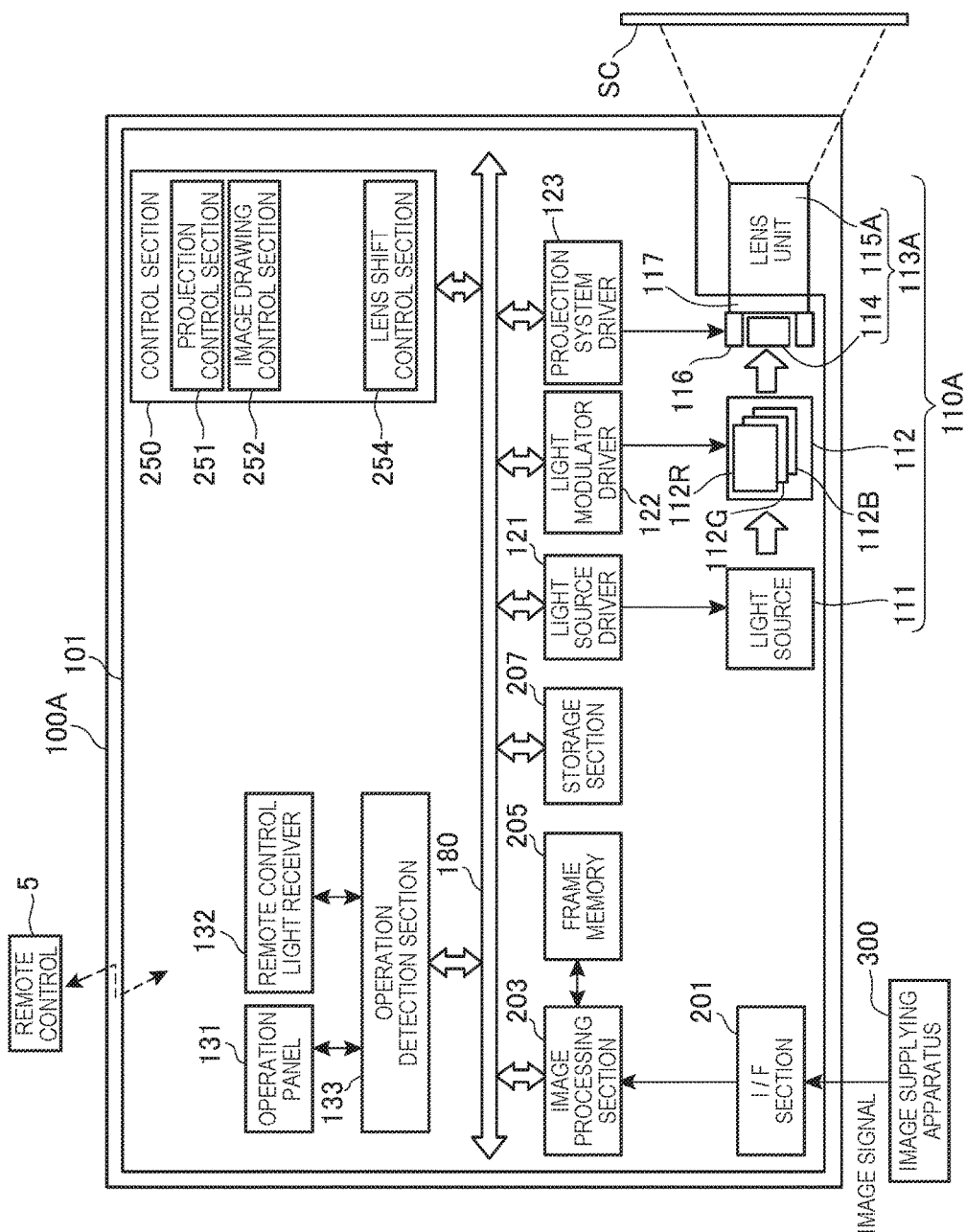
FIG. 14 is a functional block diagram of a projector according to a second embodiment.

FIG. 14 is a functional block diagram of a projector 100A according to a second embodiment to which the invention is applied. In the second embodiment, each portion configured in the same manner in the projector 100 (FIG. 2) has the same reference character and will not be described.

The projector 100A projects an image based on image data supplied from the image supplying apparatus 300 on the screen SC, as the projector 100 does. The projector 100A includes a projection section 110A, which includes the light source 111, the light modulator 112, and a projection system 113A. The projection system 113A is configured in the same manner as the projection system 113 (FIG. 2) is but differs therefrom in that a lens unit 115A is fixed to the lens mount 117.

The lens mount 117 is so configured that the lens unit 115A is undetachable or configured on the assumption that the lens unit 115A is not detached. The projector 100A can therefore be configured to include no lens information acquisition section 124 (FIG. 2) or no lens ID memory 23. Further, the control section 250 does not perform the function corresponding to the lens identification section 253 (FIG. 2).

In this case, the usage of the projector 100A is limited to a case where the lens unit 115A is used to perform projection. The storage section 207 only needs to store lens information corresponding to the lens unit 115A. Specifically, the storage section 207 does not need to store the lens ID or the same lens information 207A (FIG. 3). In this case, the storage section 207 only needs to store the lens shift range corresponding to the lens unit 115A. The image drawing control section 252 can evaluate whether or not the position of the lens mount 117 is appropriate on the basis of the position of the lens shift mechanism 116 irrespective of the lens type and other factors.

Figure 15:
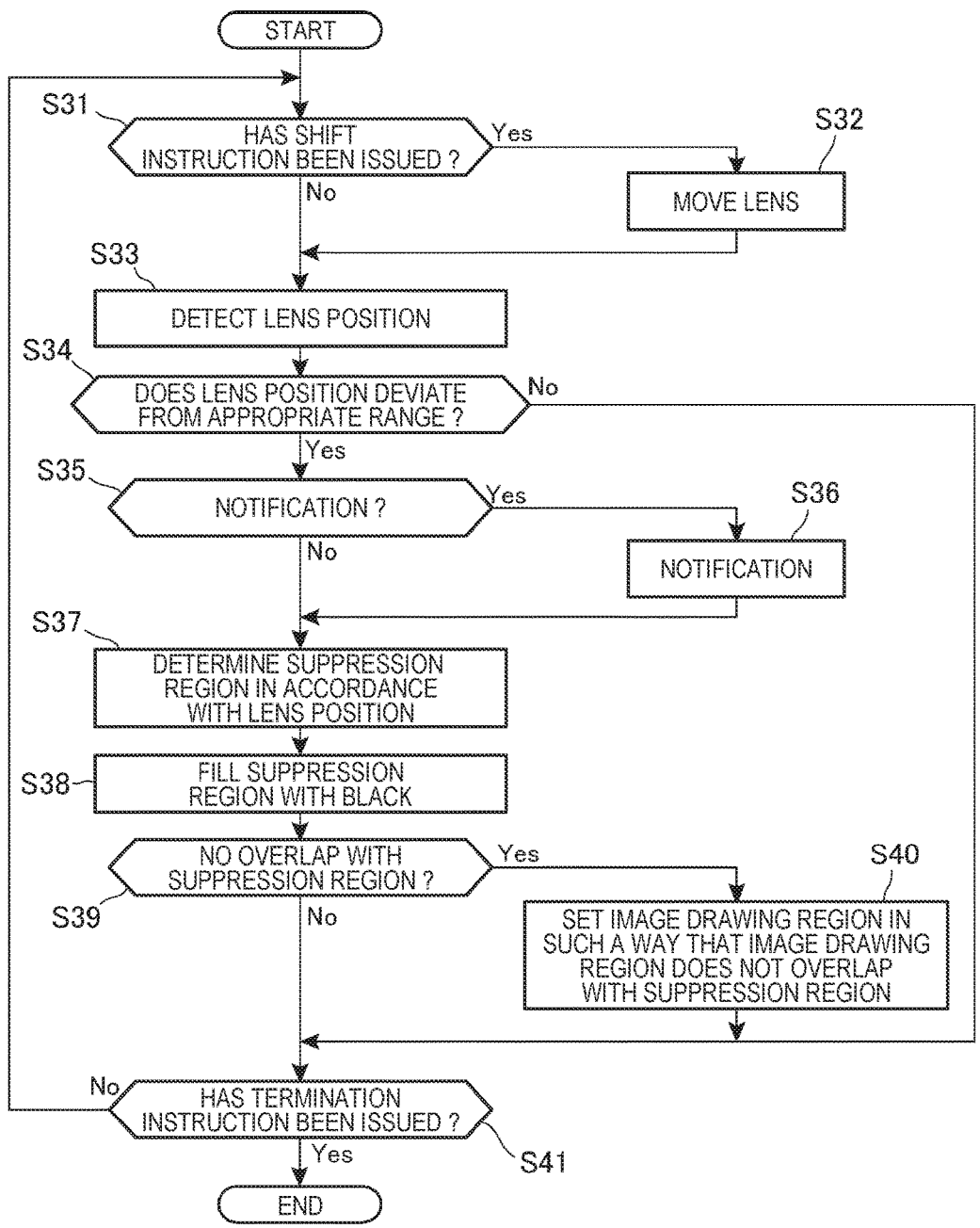
FIG. 15 is a flowchart showing the action of the projector.

FIG. 15 is a flowchart showing the action of the projector 100A according to the second embodiment.

For example, in a case where the projector 100A starts image projection in accordance with operation performed on the remote control 5 or the operation panel 131, the control section 250 starts the action shown in FIG. 15.

The control section 250 evaluates whether or not the operation performed on the remote control 5 or the operation panel 131 has instructed lens shift (step S31). In a case where lens shift instruction has been issued (Yes in step S31), the control section 250 drives the lens shift mechanism 116 in accordance with the instruction to move the lens mount 117 (step S32) and proceeds to step S33. In a case where no lens shift instruction has been issued (No in step S31), the control section 250 proceeds to step S33.

In step S33, the control section 250 detects the position of the lens mount 117 (step S33). The position of the lens mount 117 may be detected, for example, by a detector (not shown) that detects the position of the lens mount 117 or by computation based on the amount of action of the lens shift mechanism 116. The detector is a sensor, a rotary encoder, or any other component that detects the position or the amount of drive of the actuator or the motor of the lens shift mechanism 116.

The control section 250 evaluates whether or not the position of the lens mount 117 detected in step S33 deviates from an appropriate range (step S34). In a case where the position falls within the appropriate range (No in step S34), the control section 250 proceeds to step S41, which will be described later.

In the second embodiment, the appropriate range of the position of the lens mount 117 is set in accordance with the specifications of the projection system 113A, and information on the appropriate range of position is stored as the lens information in the storage section 207. The control section 250 does not identify the type of the lens unit 115A but can determine an appropriate range of position of the lens mount 117 on the basis of the lens information stored in the storage section 207.

In a case where the position of the lens mount 117 deviates from the appropriate range (Yes in step S34), the control section 250 evaluates whether or not notification is made (step S35). The control section 250 can make notification, for example, by a method for displaying an image or a text that advises that part of the projection image 402 is likely to be lost, a method for outputting the advice described above in the form of voice, or a method for causing an indicator on the operation panel 131 to blink. Whether or not the notification is made may be determined, for example, in accordance with a setting made in advance. For example, the control section 250 can determine whether or not the notification needs to be made on the basis of setting information or any other piece of information stored in the storage section 207. Instead, the user's instruction of whether or not the notification is made may be asked in step S35. Further, in a case where it is considered in advance that no notification is required, step S35 along with step S36, which will be described later, can be omitted.

In a case where a result of the evaluation shows that the notification is made (Yes in step S35), the control section 250 makes the notification based, for example, on any of the methods described above (step S36) and proceeds to step S37. In a case where a result of the evaluation shows that no notification is made (No in step S35), the control section 250 proceeds to step S37.

In step S37, the control section 250 determines the suppression region corresponding to the lens position detected in step S33 (step S37). That is, in step S37, the control section 250 determines the position, size, shape, and other factors of the region which forms the image drawing region of the light modulator 112 and where the amount of light is suppressed, as in the case of the suppression region 1122.

The control section 250 carries out the process of filling the suppression region determined in step S37 with black (step S38). The control section 250 subsequently evaluates whether or not the process of drawing an image in such a way that the image does not overlap with the suppression region is carried out (step S39). The process is, for example, the same process in step S21 (FIG. 13). In a case where a result of the evaluation shows that the process of drawing an image in such a way that the image does not overlap with the suppression region is carried out (Yes in step S39), the control section 250 controls the light modulator driver 122 to cause it to draw the image in such a way that the image does not overlap with the suppression region (step S40) and proceeds to step S41. In a case where a result of the evaluation shows that the process described above is not carried out (No in step S39), the control section 250 proceeds to step S41.

In step S41, the control section 250 evaluates whether or not operation performed on the remote control 5 or the operation panel 131 has instructed projection termination (step S41). In a case where the projection termination instruction has been issued (Yes in step S41), the control section 250 terminates the entire procedure. In a case where no projection termination instruction has been issued (No in step S41), the control section 250 returns to step S31.

As described above, the projector 100A according to the second embodiment to which the invention is applied, which has the configuration in which the lens unit 115 is not exchangeable, can provide the same advantageous effects as those provided by the projector 100 described in the first embodiment. That is, the projector 100A can project a projection image, even if part of the projection image is lost due to the positional relationship of the structure of the main body 101 and the optical design of the projector 100A with the optical axis of the lens unit 115, by using the range where no loss occurs. Further, for example, in a case where the phenomenon of vignetting caused by the upper surface 102 or deviation of the image light from the image circle of a lens in the lens unit 115 occurs, the position of the lens shift mechanism 116 can be set in advance in consideration of the optical characteristics of the lens unit 115A and other factors. Therefore, whether or not the position of the lens mount 117 is appropriate can be quickly evaluated without identification of the type of the lens unit 115, and the amount of light projected in an improper direction can be reduced, whereby adverse effects due to the improper light can be avoided or suppressed. Effects and problems due to loss of part of a projection image can therefore be avoided or suppressed in such a way that the convenience of the projector is not compromised.

The embodiments and variations described above are only examples of a specific aspect to which the invention is applied and are not intended to limit the invention, and the invention is applicable in other aspects. For example, each of the above embodiments has been described with reference to the case where the lens shift mechanism 116 is caused to operate under the control of the lens shift control section 254 in correspondence with operation performed on the remote control 5 or the operation panel 131. The invention is not limited to the case described above, and the lens shift mechanism 116 may be caused to operate until a position set in advance is reached in correspondence with the action state of the projector 100. In this case, the position of the lens shift mechanism 116 or the position of the lens mount 117 after the action of the lens shift mechanism 116 may not fall within an appropriate range.

In each of the embodiments described above, the configuration in which the light modulator 112 includes the liquid crystal panels 112R, 112G, and 112B has been presented by way of example. Each of the liquid crystal panels 112R, 112G, and 112B may be a transmissive liquid crystal panel or a reflective liquid crystal panel. The light modulator 112 may instead be formed of a digital mirror device (DMD) in place of the liquid crystal panels 112R, 112G, and 112B. The light modulator 112 may still instead be the combination of a digital mirror device and a color wheel. The light modulator 112 may instead employ a configuration in which light emitted from a light source can be modulated in place of liquid crystal panels or a DMD.

Each of the functional portions shown in FIGS. 2 and 14 represents a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiments described above may be achieved by hardware, or part of the functions achieved by hardware may be achieved by software. In addition, the specific detailed configuration of each of the other portions in the projectors 100 and 100A can be arbitrarily changed to the extent that the change does not depart from the substance of the invention.

The entire disclosure of Japanese Patent Application No. 2016-151019, filed Aug. 1, 2016 is expressly incorporated by reference herein.

What is claimed is:

1. A projector comprising:
a light source;
a light modulator that has an image drawing region where an image is drawable and modulates light emitted from the light source by using the image drawn in the image drawing region;
a projection system that includes a projection lens and projects image light modulated by the light modulator;
a lens shift mechanism that moves the projection lens in a direction perpendicular to an optical axis of the projection lens; and
a control section that controls the image drawing performed by the light modulator, wherein
the control section determines a current position of the projection lens and provides, based on the position of the projection lens, the image drawing region of the light modulator with a suppression region where an amount of the image light is suppressed, and
the control section
identifies a preset shift range of the projection lens,
performs a comparison of the current position of the projection lens with the identified preset shift range, and
in response to the comparison indicating that the position of the projection lens is outside the identified preset shift range, provides the suppression region.

2. The projector according to claim 1, further comprising an acquisition section that acquires image data, wherein the control section draws the image based on the image data acquired by the acquisition section in the image drawing region and in a position where the image does not overlap with the suppression region.

3. The projector according to claim 2, wherein the control section fills the suppression region with a predetermined color other than colors in the image based on the image data.

4. The projector according to claim 2, wherein the control section draws the entire image based on the image data in the image drawing region but in a region excluding the suppression region.

5. The projector according to claim 1, further comprising:
a lens attachment section to which the projection lens is detachably fixed; and
an identification section that identifies a type of the projection lens fixed to the lens attachment section, wherein
the control section provides, based on the position of the projection lens and the type of the projection lens determined by the identification section, the image drawing region of the light modulator with the suppression region where the amount of the image light is suppressed.

6. The projector according to claim 1, wherein the projection system is so configured that a center of an image circle of the projection lens is shifted toward one side from a center of the image drawing region.

7. The projector according to claim 6, wherein the projection lens includes a non-circular lens or mirror having a roughly circular outer shape part of which is lost and forms a lens unit that includes the projection lens and a lens barrel that accommodates the projection lens.

8. The projector according to claim 1, further comprising a main body that accommodates at least the light source and the light modulator, wherein
the projection system radiates the image light through one side of the main body toward another side thereof, and
the control section provides the image drawing region of the light modulator with the suppression region in a position corresponding to the image light with which a surface of the main body is irradiated via the projection system, and the control section draws the image in a position where the image does not overlap with the suppression region.

9. A method for controlling a projector including a light source, a light modulator that has an image drawing region where an image is drawable and modulates light emitted from the light source by using the image drawn in the image drawing region, a projection system that includes a projection lens and projects image light modulated by the light modulator, and a lens shift mechanism that moves the projection lens, the method comprising
determining a current position of the projection lens;
controlling the projector to provide, based on the position of the projection lens, the image drawing region of the light modulator with a suppression region where an amount of the image light is suppressed;
identifying a preset shift range of the projection lens;
performing a comparison of the current position of the projection lens with the identified preset shift range; and
in response to the comparison indicating that the position of the projection lens is outside the identified preset shift range, providing the suppression region.

* * * * *